United States Patent
Li et al.

(10) Patent No.: US 11,129,225 B2
(45) Date of Patent: Sep. 21, 2021

(54) CONNECTION REACTIVATION METHOD, ACCESS AND MOBILITY MANAGEMENT FUNCTION ENTITY, AND SYSTEM

(71) Applicant: HUAWEI TECHNOLOGIES CO., LTD., Guangdong (CN)

(72) Inventors: Huan Li, Shanghai (CN); Youyang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/573,642

(22) Filed: Sep. 17, 2019

(65) Prior Publication Data

US 2020/0015309 A1 Jan. 9, 2020

Related U.S. Application Data

(63) Continuation of application No. PCT/CN2017/077176, filed on Mar. 18, 2017.

(51) Int. Cl.
*H04W 4/00* (2018.01)
*H04W 76/19* (2018.01)
(Continued)

(52) U.S. Cl.
CPC .......... *H04W 76/19* (2018.02); *H04W 8/02* (2013.01); *H04W 68/005* (2013.01); *H04W 84/042* (2013.01)

(58) Field of Classification Search
CPC ......... H04W 36/0011; H04W 36/0022; H04W 36/0027; H04W 68/00; H04W 76/10; H04W 76/15; H04W 76/18; H04W 76/19
See application file for complete search history.

(56) References Cited

U.S. PATENT DOCUMENTS

| 8,681,638 | B2 | 3/2014 | Liu et al. |
| 2011/0264454 | A1 | 10/2011 | Ullberg et al. |

(Continued)

FOREIGN PATENT DOCUMENTS

| CN | 105144789 A | 12/2015 |
| CN | 105474738 A | 4/2016 |

(Continued)

OTHER PUBLICATIONS

3GPP TS 23.501 V0.3.1 (Mar. 2017),3rd Generation Partnership Project;Technical Specification Group Services and System Aspects-;System Architecture for the 5G System;Stage 2(Release 15),total 97 pages.

(Continued)

*Primary Examiner* — Matthew W Genack

(57) ABSTRACT

In a connection reactivation method, a connection of a PDU session established by user equipment on a N3GPP side is reactivated through communications via a 3GPP network. The user equipment accesses both the 3GPP and the N3GPP network and is originally in an idle state on the N3GPP network. An access and mobility management function entity receives a first message from a session management function entity to reactivate the PDU session connection of the user equipment. The access and mobility management function entity sends a second message to the user equipment via the 3GPP access network to instruct the user equipment to reactivate the connection of the PDU session.

15 Claims, 10 Drawing Sheets

(51) Int. Cl.
*H04W 8/02* (2009.01)
*H04W 68/00* (2009.01)
*H04W 84/04* (2009.01)

(56) References Cited

U.S. PATENT DOCUMENTS

| | | | |
|---|---|---|---|
| 2015/0049707 A1 | 2/2015 | Vajapeyam et al. | |
| 2016/0227469 A1 | 8/2016 | Kim et al. | |
| 2017/0310585 A1 | 10/2017 | Kim et al. | |
| 2018/0103403 A1* | 4/2018 | Van Lieshout | H04W 84/12 |
| 2018/0227743 A1* | 8/2018 | Faccin | H04W 76/10 |
| 2019/0327679 A1* | 10/2019 | Gupta | H04W 52/0229 |

FOREIGN PATENT DOCUMENTS

| | | |
|---|---|---|
| CN | 105794300 A | 7/2016 |
| CN | 105813115 A | 7/2016 |
| RU | 2602981 C2 | 11/2016 |
| WO | 2014113075 A1 | 7/2014 |
| WO | 2016056815 A1 | 4/2016 |
| WO | 2018167219 A2 | 9/2018 |

OTHER PUBLICATIONS

Samsung: "Considerations for stateless AMF",3GPP Draft; S2-171052,Feb. 13, 2017 (Feb. 13, 2017), XP051217173,total 5 pages.

3GPP TS 23.502 V0.2.0 (Feb. 2017),3rd Generation Partnership Project;Technical Specification Group Services and System Aspects;Procedures for the 5G System;Stage 2(Release 15),total 71 pages.

NTT Docomo et al: "Selective deactivation of user plane connections",3GPP Draft; S2-171171,Feb. 13, 2017 (Feb. 13, 2017),XP051217285,tptal 5 pages.

3GPP TS 23.501 V0.3.0 (Feb. 2017);3rd Generation Partnership Project;Technical Specification Group Services and System Aspects;System Architecture for the 5G System;Stage 2(Release 15),total 97 pages.

Huawei et al.,"Network-initiated Service Request for Non-3GPP Access",SA WG2 Meeting #120 S2-172036,Mar. 27-31, 2017, Busan, South Korea,total 4 pages.

\* cited by examiner

CONNECTION REACTIVATION METHOD, ACCESS AND MOBILITY MANAGEMENT FUNCTION ENTITY, AND SYSTEM

CROSS-REFERENCE TO RELATED APPLICATIONS

This application is a continuation of International Application No. PCT/CN2017/077176, filed on Mar. 18, 2017, which is hereby incorporated by reference in its entirety.

TECHNICAL FIELD

This application relates to the field of communications technologies, and in particular, to reactivating a connection of a PDU session established by user equipment.

BACKGROUND

In an architecture of a wireless communications network, a core network allows user equipment (UE) to gain access by using a 3GPP (3rd Generation Partnership Project) access network, a N3GPP (non-3GPP) access network, or both a 3GPP access network and a N3GPP access network. Gaining access by using the 3GPP access network means that the user equipment accesses the core network by using a technology specified in the 3GPP. For example, the user equipment accesses the core network by using a base station. Gaining access by using the N3GPP access network means that a user accesses the core network by using a technology specified in the non-3GPP. For example, the user accesses the core network through WiFi (Wireless Fidelity, a wireless local area network based on the IEEE 802.11b standard).

In a 5G network, when the user equipment accesses the core network by using the 3GPP access network, if the user equipment transmits no data in a period of time, the user equipment switches from a connected state (CONNECTED state) to an idle state (IDLE state), and releases air interface and NAS non-access stratum) signaling connections, thereby saving network resources and reducing electric energy consumption of the user equipment. When downlink data arrives or the user equipment needs to send uplink data or signaling, the user equipment may switch from the idle state to the connected state.

When the user equipment accesses the 5G core network by using the N3GPP access network, the user equipment is also in an idle state or a connected state. However, when downlink data to be delivered to the user equipment is received in a PDU (protocol data unit) session on a N3GPP side, there is no solution in the existing 5G network that describes how the user equipment switches from the idle state to the connected state. Therefore, when the user equipment is in the idle state, and the downlink data arrives, the user equipment cannot be paged because resources in the N3GPP access network are released, leading to a transmission failure of the downlink data.

Therefore, when the user equipment accesses the 5G core network by using the N3GPP access network and the user equipment is in the idle state, a connection reactivation solution enabling the user equipment to switch from the idle state to the connected state is urgently needed, so as to ensure successful transmission of downlink data.

SUMMARY

Embodiments of this application provide a connection reactivation method, an access and mobility management function entity, and user equipment, so as to provide, when the user equipment accesses a 5G core network by using a N3GPP access network and the user equipment is in an idle state, a connection reactivation solution enabling the user equipment to switch from the idle state to a connected state, thereby ensuring successful transmission of downlink data.

Embodiments of this application provide a connection reactivation method, an access and mobility management function entity, and user equipment, so as to provide, when the user equipment accesses a 5G core network by using a N3GPP access network and the user equipment is in an idle state, a connection reactivation solution enabling the user equipment to switch from the idle state to a connected state, thereby ensuring successful transmission of downlink data.

According to a first aspect, an embodiment of this application provides a connection reactivation method. The method includes: An access and mobility management function entity receives a first message sent by a session management function entity. The first message carries a first reactivation indication used to instruct to reactivate a connection for a PDU session established by user equipment on a N3GPP side.

When the user equipment is in an idle state on the N3GPP side, the access and mobility management function entity stores the first reactivation indication. The access and mobility management function entity receives, by using a N3GPP access network, a second message sent by the user equipment. The second message is a periodic registration request or a first service request. The access and mobility management function entity sends a third message to the user equipment based on the first reactivation indication by using the N3GPP access network. The third message carries a connection reactivation indication to instruct the user equipment to reactivate the connection for the PDU session.

Alternatively, when the user equipment is in an idle state on the N3GPP side, the access and mobility management function entity sends a fourth message to the session management function entity. The fourth message is used to indicate that the user equipment is not reachable.

When the user equipment is in the idle state, the access and mobility management function entity stores the first reactivation indication after receiving the first message sent by the session management function entity, sends the third message to the user equipment based on the first reactivation indication after the user equipment initiates the periodic registration request or the first service request, and adds the connection reactivation indication to the third message, to instruct the user equipment to reactivate the connection for the PDU session established by the user equipment on the N3GPP side. Therefore, according to the connection reactivation method provided in the first aspect, when the user equipment accesses the core network by using only the N3GPP access network and the user equipment is in the idle state, a connection reactivation solution enabling the user equipment to switch from the idle state to a connected state can be provided, so that the user equipment can reactivate the connection for the PDU session.

It should be noted that, the first reactivation indication may be a session identifier of the PDU session. The connection reactivation indication may include one or more of the following: the session identifier of the PDU session, a radio access technology type associated to the PDU session, and an access network identifier associated to the PDU session.

Based on the first aspect, in a possible implementation, the access and mobility management function entity obtains a data cache timer after receiving the first message sent by the session management function entity. Before the data cache timer times out, the access and mobility management function entity sends the third message to the user equipment based on the first reactivation indication by using the N3GPP access network.

Optionally, the access and mobility management function entity may also send the data cache timer to a user plane function entity by using the session management function entity. In this case, the data cache timer may be used to indicate duration in which the user plane function entity caches downlink data. That is, when the data cache timer times out, the user plane function entity discards downlink data to be delivered to the user equipment in the PDU session.

Based on the first aspect, in a possible implementation, before the access and mobility management function entity sends the fourth message to the session management function entity, the access and mobility management function entity may determine, based on a time point at which the user equipment initiates a next periodic registration request, whether to send the fourth message.

If a temporal distance between the time point at which the user equipment initiates the next periodic registration request and a current time point is relatively long, the access and mobility management function entity may send the fourth message to the session management function entity, to indicate that the user equipment is not reachable. In this case, after receiving the fourth message, the session management function entity may instruct the user plane function entity to discard the downlink data to be delivered to the user equipment, thereby avoiding a resource waste caused by long-term storage of the downlink data in the user plane function entity.

According to a second aspect, an embodiment of this application provides a connection reactivation method. The method includes: User equipment sends a second message to an access and mobility management function entity by using a N3GPP access network. The second message is a periodic registration request or a first service request. The user equipment receives, by using the N3GPP access network, a third message sent by the access and mobility management function entity. The third message carries a connection reactivation indication to instruct the user equipment to reactivate, by using the N3GPP access network, a connection for a PDU session established on a N3GPP side. The user equipment initiates a second service request by using the N3GPP access network. The second service request is used to request to reactivate the connection for the PDU session.

The connection reactivation indication includes one or more of the following: a session identifier of the PDU session, a radio access technology type associated to the PDU session, and an access network identifier associated to the PDU session.

According to a third aspect, an embodiment of this application provides a connection reactivation method. The method includes: An access and mobility management function entity receives a first message sent by a session management function entity. The first message carries a first reactivation indication used to instruct to reactivate a connection for a PDU session established by user equipment on a N3GPP side. When the user equipment is in an idle state on the N3GPP side, the access and mobility management function entity sends a second message to the user equipment based on the first reactivation indication by using a 3GPP access network, where the second message is used to instruct the user equipment to reactivate the connection for the PDU session.

The first reactivation indication includes a session identifier of the PDU session.

When the user equipment is in the idle state, after receiving the first message that carries the first reactivation indication and that is delivered by the session management function entity, the access and mobility management function entity sends the second message to the user equipment based on the first reactivation indication by using the 3GPP access network, so as to instruct, by using the second message, the user equipment to reactivate the connection for the PDU session established on the N3GPP side. After receiving the second message, the user equipment may initiate the service request based on the second message, so as to reactivate the connection for the PDU session established on the N3GPP side. In the connection reactivation method provided in the third aspect, because the user equipment has accessed the core network by using the 3GPP access network, the access and mobility management function entity may send the second message to the user equipment by using the 3GPP access network, so as to instruct the user equipment to reactivate the connection for the PDU session established on the N3GPP side. According to the connection reactivation method provided in the third aspect, when the user equipment has accessed the core network by using both the 3GPP access network and a N3GPP access network and the user equipment is in the idle state on the N3GPP side, a connection reactivation solution enabling the user equipment to switch from the idle state to a connected state on the N3GPP side can be provided, so that the user equipment can reactivate the connection for the PDU session established on the N3GPP side, thereby ensuring successful transmission of downlink data on the N3GPP side.

Based on the third aspect, in a possible implementation, that the access and mobility management function entity sends a second message to the user equipment based on the first reactivation indication by using a 3GPP access network, where the second message is used to instruct the user equipment to reactivate the connection for the PDU session, may be specifically implemented in the following two manners:

Manner 1

When determining that the user equipment is in a connected state on a 3GPP side, the access and mobility management function entity sends a notification message to the user equipment based on the first reactivation indication by using the 3GPP access network. The notification message carries a connection reactivation indication, and the connection reactivation indication is used to instruct the user equipment to reactivate the connection for the PDU session.

The connection reactivation indication includes one or more of the following: the session identifier of the PDU session, a radio access technology type associated to the PDU session, and an access network identifier associated to the PDU session.

Manner 2

When determining that the user equipment is in an idle state on a 3GPP side, the access and mobility management function entity sends a paging message to the user equipment based on the first reactivation indication by using the 3GPP access network. The paging message carries a connection reactivation indication, and the connection reactivation indication is used to instruct the user equipment to reactivate the connection for the PDU session.

The connection reactivation indication includes one or more of the following: the session identifier of the PDU session, a radio access technology type associated to the PDU session, and an access network identifier associated to the PDU session.

Based on the third aspect, in a possible implementation, the second message is used to instruct the user equipment to reactivate the connection for the PDU session by using the N3GPP access network.

When the second message is used to instruct the user equipment to reactivate the connection for the PDU session by using the N3GPP access network, the access and mobility management function entity may instruct, by using the second message, the user equipment to reactivate the connection for the PDU session by using the N3GPP access network. After receiving the second message by using the 3GPP access network, the user equipment can initiate, by using the N3GPP access network, a service request for reactivating the PDU session.

Based on the third aspect, in a possible implementation, after receiving the first message sent by the session management function entity and before sending the second message to the user equipment, the access and mobility management function entity binds a context of the PDU session to the 3GPP side. The second message is used to instruct the user equipment to reactivate the connection for the PDU session by using the 3GPP access network after the user equipment switches the PDU session from the N3GPP side to the 3GPP side.

In addition, the access and mobility management function entity may obtain a network policy before binding the context of the PDU session to the 3GPP side. The network policy is used to indicate that the PDU session can be switched from the N3GPP side to the 3GPP side.

A specific manner of obtaining the network policy by the access and mobility management function entity may be: The access and mobility management function entity obtains the network policy from a UDM (unified data management) or a PCF (policy control function entity) when the PDU session is established. Alternatively, the access and mobility management function entity obtains the network policy from a UDM or a PCF when receiving the first message.

The second message sent by the access and mobility management function entity to the user equipment is used to instruct the user equipment to reactivate the connection for the PDU session by using the 3GPP access network after the user equipment switches the PDU session from the N3GPP side to the 3GPP side. In this case, after receiving the second message, the user equipment may initiate a service request based on an indication of the second message by using the 3GPP access network, to request to reactivate the connection for the PDU session established on the N3GPP side.

According to a fourth aspect, an embodiment of this application provides a connection reactivation method. The method includes: When user equipment is in an idle state on a N3GPP side, the user equipment receives, by using a 3GPP access network, a second message sent by an access and mobility management function entity. The second message is used to instruct to reactivate a connection for a PDU session established on the N3GPP side. The user equipment initiates a service request, where the service request is used to request to reactivate the connection for the PDU session.

Based on the fourth aspect, in a possible implementation, that the user equipment receives, by using a 3GPP access network, a second message sent by an access and mobility management function entity may be specifically implemented in the following manners:

Manner 1

When the user equipment is in a connected state on a 3GPP side, the user equipment receives, by using the 3GPP access network, a notification message sent by the access and mobility management function entity. The notification message carries a connection reactivation indication, and the connection reactivation indication is used to instruct the user equipment to reactivate the connection for the PDU session.

Manner 2

When the user equipment is in an idle state on a 3GPP side, the user equipment receives, by using the 3GPP access network, a paging message sent by the access and mobility management function entity. The paging message carries a connection reactivation indication, and the connection reactivation indication is used to instruct the user equipment to reactivate the connection for the PDU session.

The connection reactivation indication includes one or more of the following: a session identifier of the PDU session, a radio access technology type associated to the PDU session, and an access network identifier associated to the PDU session. If the connection reactivation indication includes the PDU session identifier, the user equipment may add the PDU session identifier to the service request when initiating the service request.

Based on the fourth aspect, in a possible implementation, when the second message is used to instruct the user equipment to reactivate the connection for the PDU session by using aN3GPP access network, the user equipment initiates the service request by using the N3GPP access network.

Based on the fourth aspect, in a possible implementation, before the user equipment initiates the service request, the user equipment determines, based on the connection reactivation indication and a context stored in the user equipment, to initiate the service request by using the N3GPP access network. In this case, when initiating the service request, the user equipment may initiate the service request by using the N3GPP access network.

For example, the connection reactivation indication carried in the second message sent by the access and mobility management function entity to the user equipment includes only a context of the PDU session. In this case, when receiving the second message, the user equipment may query, based on the PDU session identifier, the context stored in the user equipment, to learn that the PDU session is established on the N3GPP side. In this case, when reactivating the connection of the PDU session, the user equipment can initiate the service request by using the N3GPP access network.

Based on the fourth aspect, in a possible implementation, if the second message instructs the user equipment to reactivate the connection of the PDU session by using the 3GPP access network after the user equipment switches the PDU session from the N3GPP side to the 3GPP side, before initiating the service request, the user equipment first binds the context of the PDU session to the 3GPP side, and then initiates the service request by using the 3GPP access network.

Based on the fourth aspect, in a possible implementation, after receiving, by using the 3GPP access network, the second message sent by the access and mobility management function entity and before initiating the service request, the user equipment may obtain a storage policy. The storage policy is used to indicate an access network selection policy of the user equipment when the user equipment initiates the service request. Then, the user equipment may initiate the service request. The user equipment initiates the service request specifically by using the following two implementations:

Manner 1

The user equipment initiates the service request based on an indication of the storage policy by using the N3GPP access network.

Manner 2

The user equipment binds the context of the PDU session to the 3GPP side based on an indication of the storage policy, and initiates the service request by using the 3GPP access network.

Specifically, the user equipment may obtain the storage policy through user configuration or by using the access and mobility management function entity.

According to a fifth aspect, this application provides an access and mobility management function entity. The access and mobility management function entity includes a receiver, a transmitter, a processor, and a memory.

The receiver is configured to receive a first message sent by a session management function entity. The first message carries a first reactivation indication used to instruct to reactivate a connection of a PDU session established by user equipment on a N3GPP side. The processor is configured to execute a program stored in the memory to perform the following operation: storing the first reactivation indication when the user equipment is in an idle state on the N3GPP side. The receiver is further configured to receive, by using a N3GPP access network, a second message sent by the user equipment. The second message is a periodic registration request or a first service request. The transmitter is configured to send a third message to the user equipment based on the first reactivation indication by using the N3GPP access network. The third message carries a connection reactivation indication to instruct the user equipment to reactivate the connection of the PDU session. The first reactivation indication may include a session identifier of the PDU session. The connection reactivation indication may include one or more of the following: the session identifier of the PDU session, a radio access technology type associated to the PDU session, and an access network identifier associated to the PDU session.

Alternatively, the receiver is configured to receive a first message sent by a session management function entity. The first message carries a first reactivation indication used to instruct to reactivate a connection of a PDU session established by user equipment on a N3GPP side. A transmitter is further configured to send a fourth message to the session management function entity when the user equipment is in an idle state on the N3GPP side. The fourth message is used to indicate that the user equipment is not reachable.

Based on the fifth aspect, in a possible implementation, the processor is further configured to execute the program stored in the memory to perform the following operation: obtaining a data cache timer after the receiver receives the first message sent by the session management function entity. When the transmitter sends the third message to the user equipment based on the first reactivation indication by using the N3GPP access network, the transmitter is specifically configured to: before the data cache timer times out, send the third message to the user equipment based on the first reactivation indication by using the N3GPP access network.

Based on the fifth aspect, in a possible implementation, the processor is further configured to execute the program stored in the memory to perform the following operation: before the transmitter sends the fourth message to the session management function entity, determining, based on a time point at which the user equipment initiates a next periodic registration request, whether to send the fourth message.

According to a sixth aspect, an embodiment of this application provides user equipment. The user equipment includes a transmitter and a receiver. The transmitter is configured to send a second message to an access and mobility management function entity by using a N3GPP access network. The second message is a periodic registration request or a first service request. The receiver is configured to receive, by using the N3GPP access network, a third message sent by the access and mobility management function entity. The third message carries a connection reactivation indication. The transmitter is further configured to initiate a second service request by using the N3GPP access network. The second service request is used to request to reactivate a connection of the PDU session, and the PDU session is established by the user equipment on a N3GPP side.

The connection reactivation indication includes one or more of the following: a session identifier of the PDU session, a radio access technology type associated to the PDU session, and an access network identifier associated to the PDU session.

According to a seventh aspect, an embodiment of this application provides an access and mobility management function entity. The access and mobility management function entity includes a receiver and a transmitter. The receiver is configured to receive a first message sent by a session management function entity. The first message carries a first reactivation indication used to instruct to reactivate a connection of a PDU session established by user equipment on a N3GPP side. The transmitter is configured to: when the user equipment is in an idle state on the N3GPP side, send a second message to the user equipment based on the first reactivation indication by using a 3GPP access network, where the second message is used to instruct the user equipment to reactivate the connection of the PDU session.

The first reactivation indication may include a session identifier of the PDU session.

Based on the seventh aspect, in a possible implementation, when sending the second message to the user equipment based on the first reactivation indication by using the 3GPP access network, where the second message is used to instruct the user equipment to reactivate the connection of the PDU session, the transmitter is specifically configured to:

when the user equipment is in a connected state on a 3GPP side, send a notification message to the user equipment based on the first reactivation indication by using the 3GPP access network, where the notification message carries a connection reactivation indication, and the connection reactivation indication is used to instruct the user equipment to reactivate the connection of the PDU session; or when that the user equipment is in an idle state on a 3GPP side, send a paging message to the user equipment based on the first reactivation indication by using the 3GPP access network, where the paging message carries a connection reactivation indication, and the connection reactivation indication is used to instruct the user equipment to reactivate the connection of the PDU session.

The connection reactivation indication includes one or more of the following: the session identifier of the PDU session, a radio access technology type associated to the PDU session, and an access network identifier associated to the PDU session.

Based on the seventh aspect, in a possible implementation, the second message is used to instruct the user equipment to reactivate the connection of the PDU session by using a N3GPP access network.

Based on the seventh aspect, in a possible implementation, the access and mobility management function entity further includes a processor. The processor is configured to execute a program stored in a memory to perform the following operation: binding a context of the PDU session to the 3GPP side after the receiver receives the first message sent by the session management function entity and before the transmitter sends the second message to the user equipment. The second message is used to instruct the user equipment to reactivate the connection of the PDU session by using the 3GPP access network after the user equipment switches the PDU session from the N3GPP side to the 3GPP side.

Based on the seventh aspect, in a possible implementation, the processor is further configured to execute the program stored in the memory to perform the following operation: obtaining a network policy before binding the context of the PDU session to the 3GPP side. The network policy is used to indicate that the PDU session can be switched from the N3GPP side to the 3GPP side.

Based on the seventh aspect, in a possible implementation, when obtaining the network policy, the processor is specifically configured to:

obtain the network policy from a UDM or a PCF when the PDU session is established, or obtain the network policy from a UDM or a PCF when the first message is received.

According to an eighth aspect, an embodiment of this application provides user equipment. The user equipment includes a receiver and a transmitter. The receiver is configured to: when the user equipment is in an idle state on a N3GPP side, receive, by using a 3GPP access network, a second message sent by an access and mobility management function entity. The second message is used to instruct to reactivate a connection of a PDU session established by the user equipment on the N3GPP side. The transmitter is configured to initiate a service request. The service request is used to request to reactivate the connection of the PDU session.

Based on the eighth aspect, in a possible implementation, when receiving, by using the 3GPP access network, the second message sent by the access and mobility management function entity, the receiver is specifically configured to: when the user equipment is in a connected state on a 3GPP side, receive, by using the 3GPP access network, a notification message sent by the access and mobility management function entity, where the notification message carries a connection reactivation indication, and the connection reactivation indication is used to instruct the user equipment to reactivate the connection of the PDU session; or when the user equipment is in an idle state on a 3GPP side, receive, by using the 3GPP access network, a paging message sent by the access and mobility management function entity, where the paging message carries a connection reactivation indication, and the connection reactivation indication is used to instruct the user equipment to reactivate the connection of the PDU session.

The connection reactivation indication includes one or more of the following: a session identifier of the PDU session, a radio access technology type associated to the PDU session, and an access network identifier associated to the PDU session. When the connection reactivation indication carries the session identifier of the PDU session, the service request may carry the session identifier of the PDU session.

Based on the eighth aspect, in a possible implementation, when initiating the service request, the transmitter is specifically configured to initiate the service request by using a N3GPP access network. The second message is used to instruct the user equipment to reactivate the connection of the PDU session by using the N3GPP access network.

Based on the eighth aspect, in a possible implementation, the user equipment further includes a processor. The processor is configured to execute a program stored in a memory to perform the following operation: before the transmitter initiates the service request, determining, based on the connection reactivation indication and a context stored in the user equipment, that the service request is to be initiated by using the N3GPP access network. When initiating the service request, the transmitter is specifically configured to initiate the service request by using the N3GPP access network.

Based on the eighth aspect, in a possible implementation, the processor is further configured to execute the program stored in the memory to perform the following operation: binding the context of the PDU session to the 3GPP side before the transmitter initiates the service request. When initiating the service request, the transmitter is specifically configured to initiate the service request by using the 3GPP access network. The second message is used to instruct the user equipment to reactivate the connection of the PDU session by using the 3GPP access network after the user equipment switches the PDU session from the N3GPP side to the 3GPP side.

Based on the eighth aspect, in a possible implementation, the processor is further configured to execute the program stored in the memory to perform the following operation: obtaining a storage policy after the receiver receives, by using the 3GPP access network, the second message sent by the access and mobility management function entity and before the transmitter initiates the service request. The storage policy is used to indicate an access network selection policy of the user equipment when the user equipment initiates the service request. When initiating the service request, the transmitter is specifically configured to: initiate the service request based on an indication of the storage policy by using the N3GPP access network; or bind the context of the PDU session to the 3GPP side based on an indication of the storage policy, and initiate the service request by using the 3GPP access network.

Based on the eighth aspect, in a possible implementation, when obtaining the storage policy, the processor is specifically configured to obtain the storage policy through user configuration or by using the access and mobility management function entity.

According to a ninth aspect, an embodiment of this application provides an access and mobility management function entity. The access and mobility management function entity and the access and mobility management function entity provided in the fifth aspect may be a same function entity. The access and mobility management function entity includes a communications unit, a processing unit, and a storage unit. The processing unit is configured to perform processing operations of the access and mobility management function entity according to the first aspect. The communications unit is configured to perform sending and receiving operations of the access and mobility management function entity according to the first aspect. The storage unit is configured to store program code and data of the access and mobility management function entity.

According to a tenth aspect, an embodiment of this application provides user equipment. The user equipment and the user equipment provided in the sixth aspect may be a same device. The user equipment includes a communications unit, a processing unit, and a storage unit. The processing unit is configured to perform processing operations of the user equipment according to the second aspect. The communications unit is configured to perform sending and receiving operations of the user equipment according to the second aspect. The storage unit is configured to store program code and data of the user equipment.

According to an eleventh aspect, an embodiment of this application provides an access and mobility management function entity. The access and mobility management function entity and the access and mobility management function entity provided in the seventh aspect may be a same function entity. The access and mobility management function entity includes a communications unit, a processing unit, and a storage unit. The processing unit is configured to perform processing operations of the access and mobility management function entity according to the third aspect. The communications unit is configured to perform sending and receiving operations of the access and mobility management function entity according to the third aspect. The storage unit is configured to store program code and data of the access and mobility management function entity.

According to a twelfth aspect, an embodiment of this application provides user equipment. The user equipment and the user equipment provided in the eighth aspect may be a same device. The user equipment includes a communications unit, a processing unit, and a storage unit. The processing unit is configured to perform processing operations of the user equipment according to the fourth aspect. The communications unit is configured to perform sending and receiving operations of the user equipment according to the fourth aspect. The storage unit is configured to store program code and data of the user equipment.

According to a thirteenth aspect, a computer-readable storage medium is provided. The computer-readable storage medium stores a computer software instruction used by the foregoing access and mobility management function entity. The computer software instruction includes an instruction used to perform the method according to any one of the foregoing aspects.

According to a fourteenth aspect, a computer-readable storage medium is provided. The computer-readable storage medium stores a computer software instruction used by the foregoing user equipment. The computer software instruction includes an instruction used to perform the method according to any one of the foregoing aspects.

According to a fifteenth aspect, this application further provides a computer program product including an instruction. When run on a computer, the computer program product causes the computer to perform the methods according to the foregoing aspects.

According to a sixteenth aspect, this application further provides a system. The system includes the access and mobility management function entity and the session management function entity described above. In a possible implementation, the system may further include a user plane function entity. In a possible implementation, the system may further include user equipment and the like.

DESCRIPTION OF EMBODIMENTS

Figure 1:
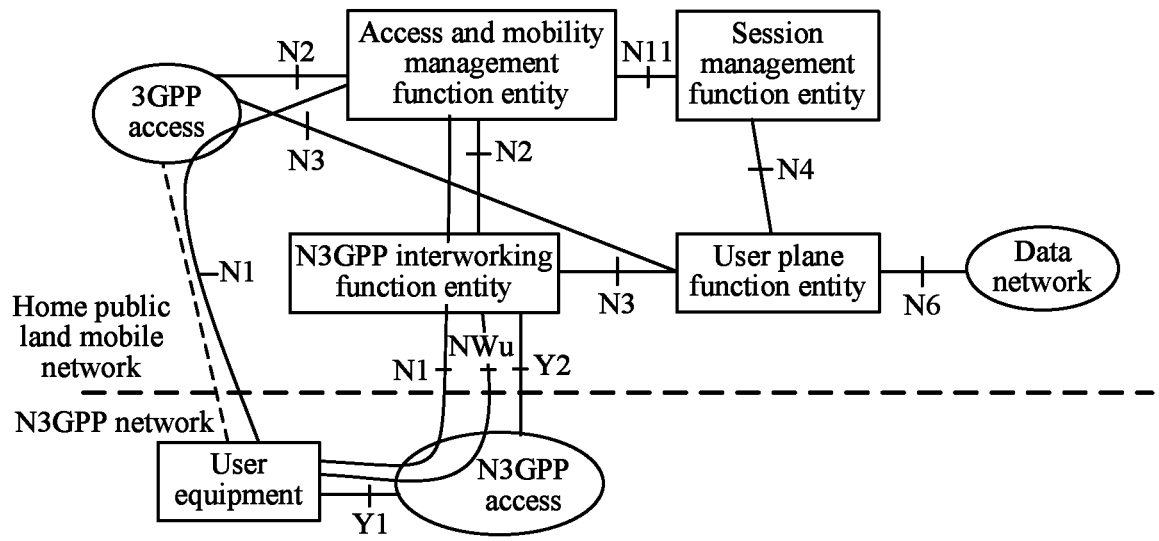
FIG. 1 is a schematic diagram of a 5G network architecture according to an embodiment of this application.

To face the challenge of wireless broadband technologies and maintain a leading position of a 3GPP network, the 3GPP standard group formulated a next generation mobile communications network architecture (Next Generation System) by the end of 2016, which is referred to as a 5G network architecture. The architecture not only supports access to a 5G core network by using a wireless technology defined by the 3GPP standard group but also supports access to the 5G core network by using aN3GPP access technology, for example, access to the 5G core network by using a N3GPP interworking function entity (N3IWF), a next-generation packet data gateway (ngPDG), a N3GPP access network device, or a N3GPP access gateway. The 5G network architecture may be shown in FIG. 1. In FIG. 1, the core network includes a user plane function entity (UPF), an access and mobility management function entity (AMF), and a session management function entity (SMF). The AMF and the SMF form a control plane function entity (CPF). The UPF is mainly responsible for data packet forwarding, quality of service (QoS) control, billing information statistics, and the like. The CPF is mainly responsible for user registration authentication, mobility management, and delivery of a data packet forwarding policy, a QoS control policy, and the like to the UPF. Specifically, the AMF is responsible for a registration procedure during user access and location management in a user movement process. The SMF is responsible for establishing a corresponding session connection on a network side when a user initiates a service, and providing a specific service for the user, especially delivering a data packet forwarding policy, a QoS policy, and the like to the UPF based on an NG4 interface between the SMF and the UPF It should be noted that, an N3IWF in FIG. 1 is one type of a N3GPP access gateway. A name of the N3GPP access gateway is not limited in this application, and may be N3IWF, ngPDG, N3GPP access network device, N3GPP access gateway, or the like.

It should be noted that, in embodiments of this application, the control plane function entity, the user plane function entity, the access and mobility management function entity, and the session management function entity each are merely a name, and the name imposes no limitation on the device. In a future 5G network and another future network, network elements or entities corresponding to the control plane function entity, the user plane function entity, the access and mobility management function entity, and the session management function entity may also have other names. This is not specifically limited in the embodiments of this application. For example, the control plane function entity may further be replaced with a control plane function or a CP, and the user plane function entity may further be replaced with a user plane function or a UP. Details are collectively described herein and are not further described below.

It should further be noted that, in addition to functions in the embodiments of this application, the control plane function entity, the user plane function entity, the access and mobility management function entity, the session management function entity, and the like may further have other functions. This is not specifically limited in the embodiments of this application. In addition, the control plane function entity, the user plane function entity, the access and mobility management function entity, the session management function entity, and the like may be implemented by one physical device or may be implemented by a plurality of physical devices together. This is not specifically limited in the embodiments of this application. In other words, it may be understood that, the control plane function entity, the user plane function entity, the access and mobility management function entity, the session management function entity, and the like in the embodiments of this application each may be a logical function module in a physical device, or may be a logical function module including a plurality of physical devices. This is not specifically limited in the embodiments of this application.

When user equipment accesses the 5G core network by using a N3GPP access network, if downlink data to be delivered to the user equipment in an idle state is received in a PDU session established on a N3GPP side, the user equipment cannot be paged because there is no solution in the existing 5G network that describes how the user equipment switches from the idle state to a connected state. Consequently, a transmission failure of the downlink data is caused.

The embodiments of this application provide a connection reactivation method, a control plane function entity, and user equipment, so as to provide, when the user equipment accesses a 5G core network by using a N3GPP access network and the user equipment is in an idle state, a connection reactivation solution enabling the user equipment to switch from the idle state to the connected state, thereby ensuring successful transmission of downlink data.

The connection reactivation method provided in this application is described in detail by using two embodiments in the following.

Embodiment 1

Figure 2:
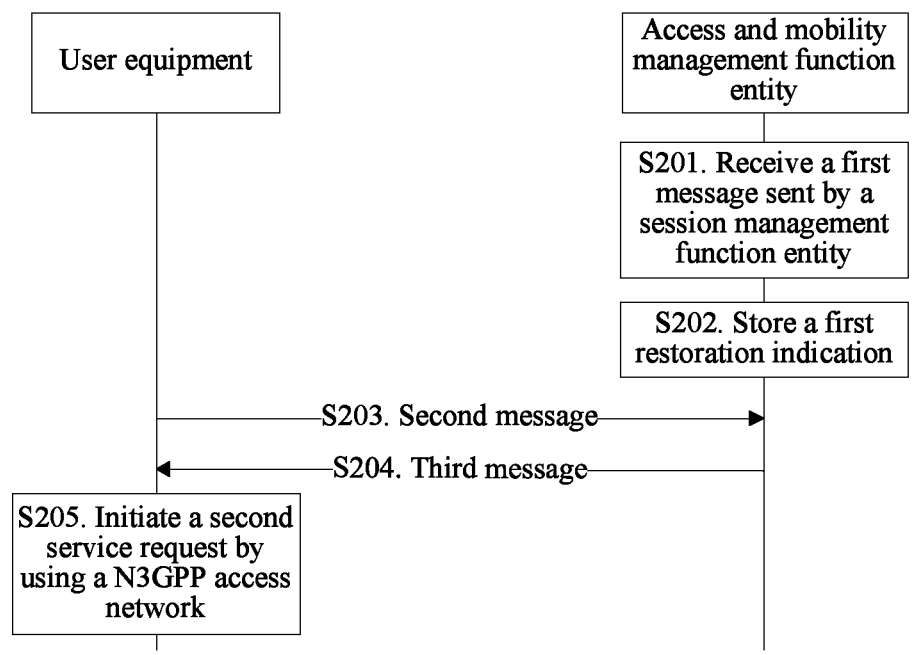
FIG. 2 is a schematic flowchart of a first connection reactivation method according to an embodiment of this application.

As shown in FIG. 2, FIG. 2 shows a connection reactivation method provided in this embodiment of this application. The method includes the following steps.

S201. An access and mobility management function entity receives a first message sent by a session management function entity.

The first message carries a first reactivation indication used to instruct to reactivate a connection of a PDU session established by user equipment on a N3GPP side. The user equipment is in an idle state on the N3GPP side. The first reactivation indication may be a session identifier of the PDU session (hereinafter briefly referred to as a PDU session identifier).

It should be noted that, the PDU session is a PDU session established before the user equipment switches from a connected state to the idle state on the N3GPP side.

In this application, when a user plane function entity receives, in the foregoing PDU session, downlink data to be delivered to the user equipment, because a user plane connection of the PDU session is deactivated, the user plane function entity cannot deliver the downlink data to the user equipment. In this case, the user plane function entity may send a downlink data notification (DDN) message to the session management function entity. After receiving the DDN message, the session management function entity may send the first message to the access and mobility management function entity to instruct the user equipment to reactivate a connection of the PDU session.

S202. The access and mobility management function entity stores a first reactivation indication.

reactivating the connection of the PDU session means establishing or activating the user plane connection of the PDU session.

S203. User equipment sends a second message to the access and mobility management function entity by using a N3GPP access network.

The second message is a periodic registration request or a first service request.

It should be noted that, when the user equipment has been registered with a core network and is in the idle state, if the user equipment needs to reactivate a connection to the core network (for example, when a periodic timer of the user equipment times out), the user equipment may initiate a registration request, and set a registration type as periodic registration.

When the user equipment needs to send uplink data in another PDU session than the foregoing PDU session, the user equipment may send the first service request.

In addition, when the user equipment needs to send uplink data in the foregoing PDU session, the user equipment may also initiate the first service request. In this case, the user equipment spontaneously reactivates the connection of the PDU session, and the access and mobility management function entity deletes a connection reactivation indication stored in S202. In addition, the following step S204 and step S205 no longer need to be performed.

S204. The access and mobility management function entity sends a third message to the user equipment based on the first reactivation indication by using the N3GPP access network.

The third message carries the connection reactivation indication. When the second message is a periodic registration request message, the third message is a periodic registration response message. When the second message is a service request message of a second PDU session, the third message is a service request response message of the second PDU session.

The connection reactivation indication includes one or more of the following: the PDU session identifier, a radio access technology type associated to the PDU session, and an access network identifier associated to the PDU session.

It should be noted that, in the method shown in FIG. 2, the first reactivation indication is carried in the first message, and the first reactivation indication may be the PDU session identifier. The connection reactivation indication is carried in the third message, and the connection reactivation indication may be one or more of the PDU session identifier, the radio access technology type associated to the PDU session, and the access network identifier associated to the PDU session. That is, after storing the first reactivation indication, the access and mobility management function entity may obtain the radio access technology type or the access network identifier associated to the PDU session through analysis, or learn of the radio access technology type or the access network identifier associated to the PDU session by receiving the message sent by the session management function entity. The access and mobility management function entity optionally adds one or more of the PDU session identifier, the radio access technology type associated to the PDU session, and the access network identifier associated to the PDU session to the third message when sending the third message to the user equipment, to instruct the user equipment to reactivate the connection of the PDU session.

In this application, after receiving the first message, the access and mobility management function entity may obtain a data cache timer. The data cache timer may be sent to the access and mobility management function entity after being configured by the session management function entity, may be configured by the access and mobility management function entity, may be preconfigured in the access and mobility management function entity, or the like.

If the data cache timer has timed out, the access and mobility management function entity deletes the first reactivation indication, and when the access and mobility management function entity receives the second message, the third message sent by the access and mobility management function entity to the user equipment does not need to carry the connection reactivation indication. If the data cache timer has not timed out when the access and mobility management function entity receives the second message, the third message sent by the access and mobility management function entity to the user equipment carries the connection reactivation indication, to instruct the user equipment to initiate a second service request for reactivating the PDU session, so as to receive the delivered downlink data.

Optionally, the access and mobility management function entity may also send the data cache timer to the user plane function entity by using the session management function entity. In this case, the data cache timer may be used to indicate duration in which the user plane function entity caches the downlink data. That is, when the data cache timer times out, the user plane function entity discards the downlink data to be delivered to the user equipment in the PDU session.

S205. The user equipment initiates a second service request by using the N3GPP access network.

The second service request is used to request to reactivate the connection of the PDU session. After initiating the second service request by using the N3GPP access network, the user equipment can switch from the idle state to the connected state, to receive the delivered downlink data.

For example, the connection reactivation indication carried in the third message includes the PDU session identifier and the radio access technology type associated to the PDU session. After receiving the radio access technology type associated to the PDU session that is included in the connection reactivation indication, the user equipment initiates the second service request by using the N3GPP access network.

For example, the connection reactivation indication carried in the third message includes the PDU session identifier and the access network identifier associated to the PDU session. After receiving the access network identifier associated to the PDU session that is included in the connection reactivation indication, the user equipment initiates the second service request by using the N3GPP access network, where an access network of the PDU session is the N3GPP access network.

For another example, the connection reactivation indication carried in the third message includes the PDU session identifier. After receiving the PDU session identifier included in the connection reactivation indication, the user equipment may initiate the second service request by using the N3GPP access network after receiving the third message.

In addition, when the user equipment is in the idle state on the N3GPP side, the access and mobility management function entity may also send a fourth message to the session management function entity after receiving the first message sent by the session management function entity, to indicate, by using the fourth message, that the user equipment is not reachable. In this case, after receiving the fourth message, the session management function entity may instruct the user plane function entity to discard the downlink data to be delivered to the user equipment.

Specifically, before the access and mobility management function entity sends the fourth message to the session management function entity, the access and mobility management function entity may determine, based on a time point at which the user equipment initiates a next periodic registration request, whether to send the fourth message. This is because the connection reactivation method shown in FIG. 2 is based on the periodic registration request or the first service request initiated by the user equipment. A sending time point and a sending frequency of the periodic registration request message can be predicted by the access and mobility management function entity. A sending time point of the first service request cannot be predicted by the access and mobility management function entity. Considering only a periodic registration request process that can be predicted, if a temporal distance between the time point at which the user equipment initiates the next periodic registration request and a current moment is excessively long, the user plane function entity needs to continually cache the downlink data to be delivered to the user equipment. This undoubtedly occupies system overheads and affects processing efficiency of the user plane function entity. In this case, the access and mobility management function entity may perform determining based on the time point at which the user equipment initiates the next periodic registration request. If the temporal distance between the time point at which the user equipment initiates the next periodic registration request and the current moment is excessively long, the access and mobility management function entity sends the fourth message to the session management function entity. After receiving the fourth message, the session management function entity instructs the user plane function entity to discard the downlink data to be delivered to the user equipment, thereby reducing system overheads of the user plane function entity and improving processing efficiency of the user plane function entity.

In the connection reactivation method shown in FIG. 2, when the user equipment is in the idle state, the access and mobility management function entity stores the first reactivation indication after receiving the first message sent by the session management function entity, sends the third message to the user equipment based on the first reactivation indication after the user equipment initiates the periodic registration request or the first service request, and adds the connection reactivation indication to the third message, to instruct the user equipment to reactivate the connection of the PDU session established by the user equipment on the N3GPP side. Therefore, according to the connection reactivation method shown in FIG. 2, when the user equipment accesses the core network by using only the N3GPP access network and the user equipment is in the idle state, a connection reactivation solution enabling the user equipment to switch from the idle state to the connected state can be provided, so that the user equipment can reactivate the connection of the PDU session.

Figure 3:
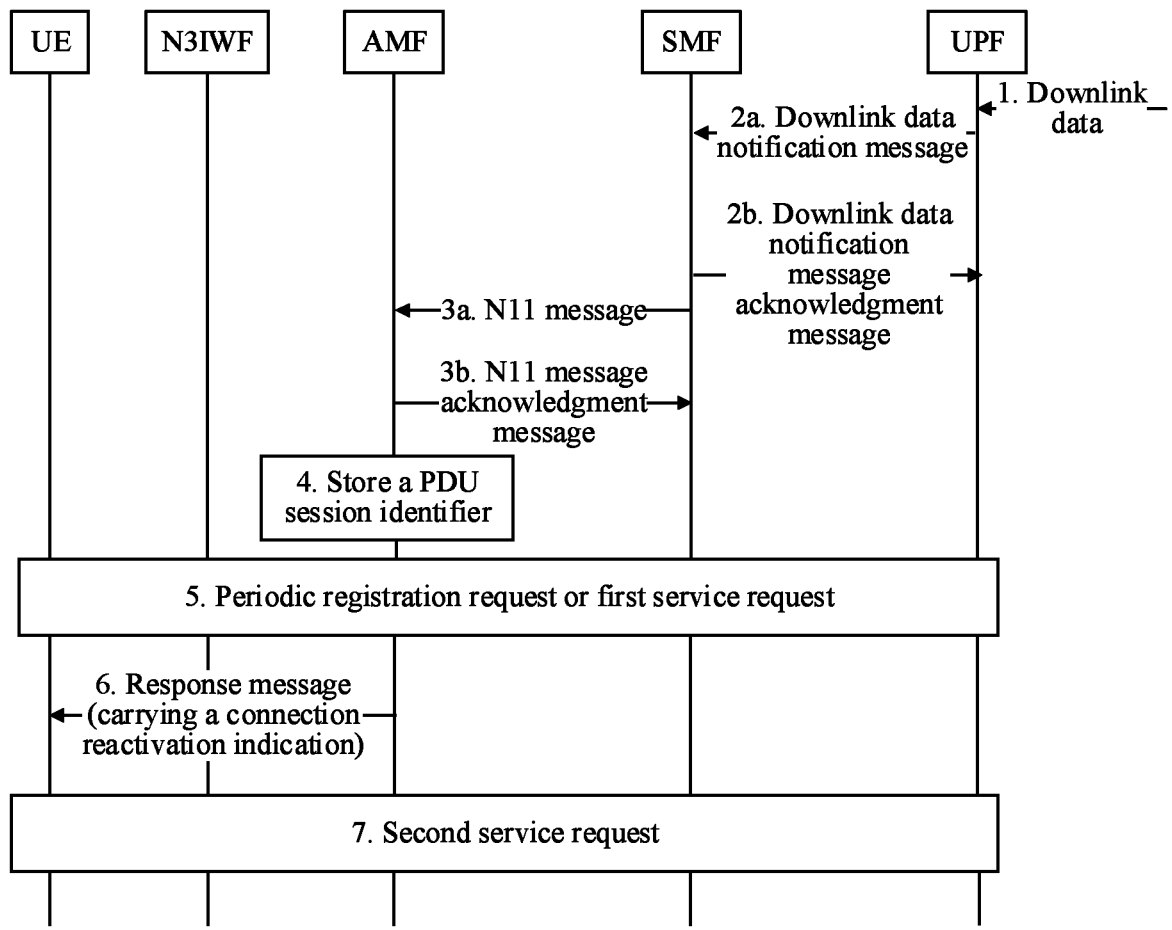
FIG. 3 is a schematic flowchart of a second connection reactivation method according to an embodiment of this application.

Based on the connection reactivation method shown in FIG. 2, this embodiment of this application further provides a connection reactivation method. The method is shown in FIG. 3. The connection reactivation method shown in FIG. 3 may be considered as a specific example of the connection reactivation method shown in FIG. 2. For an implementation not illustrated and described in detail in the method shown in FIG. 3, refer to related descriptions in the method shown in FIG. 2. As shown in FIG. 3, the method includes the following steps.

1. A UPF receives, in a PDU session established on a N3GPP side, downlink data to be delivered to user equipment.

2a. The UPF sends a downlink data notification message to an SMF.

The downlink data notification message is used to indicate that the UPF has received, in the PDU session established on the N3GPP side, downlink data to be delivered to the UE. The downlink data notification message carries a PDU session identifier, and the UE is in an idle state on the N3GPP side.

2b. The SMF sends a downlink data notification message acknowledgment message to the UPF after receiving the downlink data notification message, to indicate that the SMF has received the downlink data notification message sent by the UPF.

3a. The SMF sends an N11 message to an AMF.

The N11 message may be considered as an example of the first message in the method shown in FIG. 2, and the N11 message carries the PDU session identifier.

3b. The AMF sends an N11 message acknowledgment message to the SMF, to indicate that the AMF has received the N11 message sent by the SMF.

4. The AMF stores the PDU session identifier.

In the connection reactivation method shown in FIG. 3, a data cache timer may be configured by the AMF or the SMF. When the data cache timer is configured by the AMF, the AMF sends the data cache timer to the SMF by adding the data cache timer to the N11 message acknowledgment message sent in step 3b, and the SMF sends the data cache timer to the UPF. When the data cache timer is configured by the SMF, the SMF sends the data cache timer to the UPF by adding the data cache timer to the downlink data notification message acknowledgment message sent in step 2b, and sends the data cache timer to the AMF.

5. The UE initiates a periodic registration request or a first service request by using an N3IWF.

That the UE initiates the periodic registration request or the first service request by using the N3IWF means that the UE initiates the periodic registration request or the first service request by using a N3GPP access network.

A first service request message is sent by the user equipment to the access and mobility management function entity when the user equipment needs to send uplink data in a PDU session established on the N3GPP side.

6. Before a data cache timer times out, the AMF sends a response message to the UE by using the N3IWF, where the response message carries a connection reactivation indication.

The connection reactivation indication may include one or more of the following: the PDU session identifier, a radio access technology type associated to the PDU session, and an access network identifier associated to the PDU session.

The response message may be considered as an example of the third message in the method shown in FIG. 2. The response message is used to respond to the periodic registration request or a service request of a second PDU session that is of the user equipment.

That the AMF sends the response message to the UE by using the N3IWF means that the AMF sends the response message to the UE by using the N3GPP access network.

7. After receiving the response message that includes the connection reactivation indication and that is sent by the AMF, the UE initiates a second service request by using the N3IWF, and establishes or activates a user plane connection of the PDU session, so as to receive the downlink data to be delivered to the UE.

That the UE initiates the second service request by using the N3IWF means that the UE initiates the second service request by using the N3GPP access network.

Embodiment 2

Figure 4:
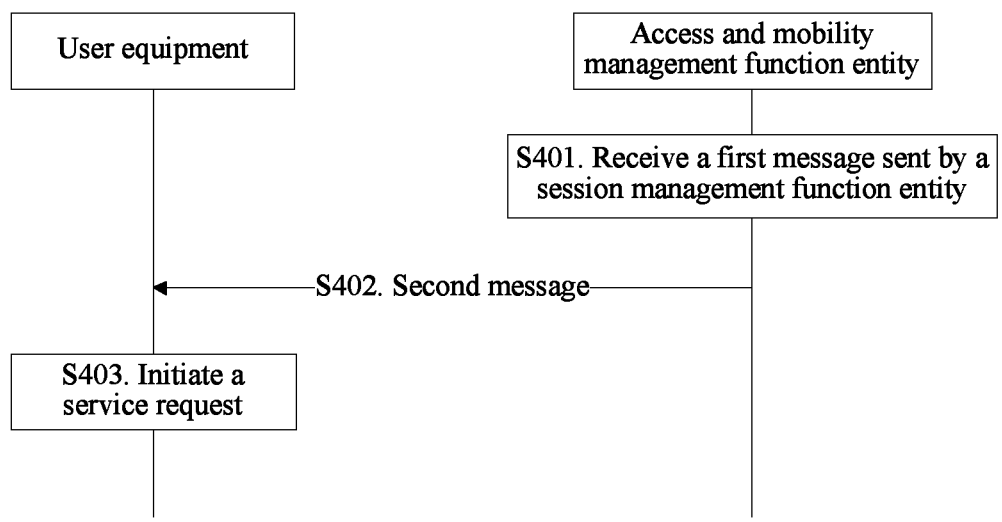
FIG. 4 is a schematic flowchart of a third connection reactivation method according to an embodiment of this application.

As shown in FIG. 4, FIG. 4 shows a connection reactivation method provided in this embodiment of this application. The method includes the following steps.

S401. An access and mobility management function entity receives a first message sent by a session management function entity.

The first message carries a first reactivation indication used to instruct to reactivate a connection of a PDU session established by user equipment on a N3GPP side. The first reactivation indication may be a session identifier of the PDU session (hereinafter briefly referred to as a PDU session identifier).

It should be noted that, the PDU session is a PDU session established before the user equipment switches from a connected state to an idle state on the N3GPP side.

In this application, when a user plane function entity receives, in the foregoing PDU session, downlink data to be delivered to the user equipment, because a user plane connection of the PDU session is deactivated, the user plane function entity cannot deliver the downlink data to the user equipment. In this case, the user plane function entity may send a downlink data notification (DDN) message to the session management function entity. After receiving the DDN message, the session management function entity may send the first message to the access and mobility management function entity to instruct the user equipment to reactivate a connection of the PDU session.

S402. The access and mobility management function entity sends a second message to user equipment based on a first reactivation indication by using a 3GPP access network.

The user equipment is in the idle state on the N3GPP side, and the second message is used to instruct the user equipment to reactivate the connection of the PDU session.

reactivating the connection of the PDU session means establishing or activating the user plane connection of the PDU session.

That the access and mobility management function entity sends a second message to user equipment based on a first reactivation indication by using a 3GPP access network may be specifically implemented as follows: When determining that the user equipment is in a connected state on a 3GPP side, the access and mobility management function entity sends a notification message to the user equipment based on the first reactivation indication by using the 3GPP access network. The notification message carries a connection reactivation indication, and the connection reactivation indication is used to instruct the user equipment to reactivate the connection of the PDU session. Alternatively, when determining that the user equipment is in an idle state on a 3GPP side, the access and mobility management function entity sends a paging message to the user equipment based on the first reactivation indication by using the 3GPP access network. The paging message carries a connection reactivation indication, and the connection reactivation indication is used to instruct the user equipment to reactivate the connection of the PDU session.

When the user equipment is in the connected state on the 3GPP side, the access and mobility management function entity may send the connection reactivation indication to the user equipment by using the notification message. When the user equipment is in the idle state on the 3GPP side, it is difficult for the access and mobility management function entity to directly send the notification message to the user equipment. Consequently, the access and mobility management function entity needs to send the connection reactivation indication to the user equipment by using the paging message.

The connection reactivation indication may include one or more of the following: the PDU session identifier, a radio access technology type (RAT type) of the PDU session, and an access network identifier associated to the PDU session.

It should be noted that, in the method shown in FIG. 4, the first reactivation indication is carried in the first message, and the first reactivation indication may be a PDU session identifier. The connection reactivation indication is carried in the second message, and the connection reactivation indication may be one or more of the PDU session identifier, the radio access technology type associated to the PDU session, and the access network identifier associated to the PDU session. In other words, the access and mobility management function entity optionally adds one or more of the PDU session identifier, the radio access technology type associated to the PDU session, and the access network identifier associated to the PDU session to the second message when sending the second message to the user equipment, to instruct the user equipment to reactivate the connection of the PDU session. The user equipment may determine, based on content included in the connection reactivation indication, an indication of the access and mobility management function entity or a storage policy of the user equipment, a context stored in the user equipment, and the like, whether to reactivate the connection of the PDU session by using a N3GPP access network or the 3GPP access network.

S403. The user equipment initiates a service request, where the service request is used to request to reactivate a connection of the PDU session.

In the connection reactivation method shown in FIG. 4, when the user equipment is in the idle state, after receiving the first message that carries the first reactivation indication and that is delivered by the session management function entity, the access and mobility management function entity sends the second message to the user equipment based on the first reactivation indication by using the 3GPP access network, so as to instruct, by using the second message, the user equipment to reactivate the connection of the PDU session established on the N3GPP side. After receiving the second message, the user equipment may initiate the service request based on the second message, so as to reactivate the connection of the PDU session established on the N3GPP side. In the method shown in FIG. 4, because the user equipment has accessed a core network by using the 3GPP access network, the access and mobility management function entity sends the second message to the user equipment by using the 3GPP access network, so as to instruct the user equipment to reactivate the connection of the PDU session established on the N3GPP side. According to the method shown in FIG. 4, when the user equipment has accessed the core network by using both the 3GPP access network and the N3GPP access network and the user equipment is in the idle state on the N3GPP side, a connection reactivation solution enabling the user equipment to switch from the idle state to the connected state on the N3GPP side can be provided, so that the user equipment can reactivate the connection of the PDU session established on the N3GPP side, thereby ensuring successful transmission of the downlink data on the N3GPP side.

The access and mobility management function entity may instruct, by using the second message sent by the access and mobility management function entity to the user equipment, the user equipment to reactivate the connection of the PDU session by using the N3GPP access network or the 3GPP access network. Alternatively, the access and mobility management function entity does not indicate, in the second message, an access network by using which the user equipment reactivates the connection of the PDU session. Instead, the user equipment determines an access network by using which the connection of the PDU session is reactivated. Therefore, in the foregoing three scenarios, Embodiment 2 may have the following three implementations: Embodiment A, Embodiment B, and Embodiment C.

Embodiment A

Figure 5:
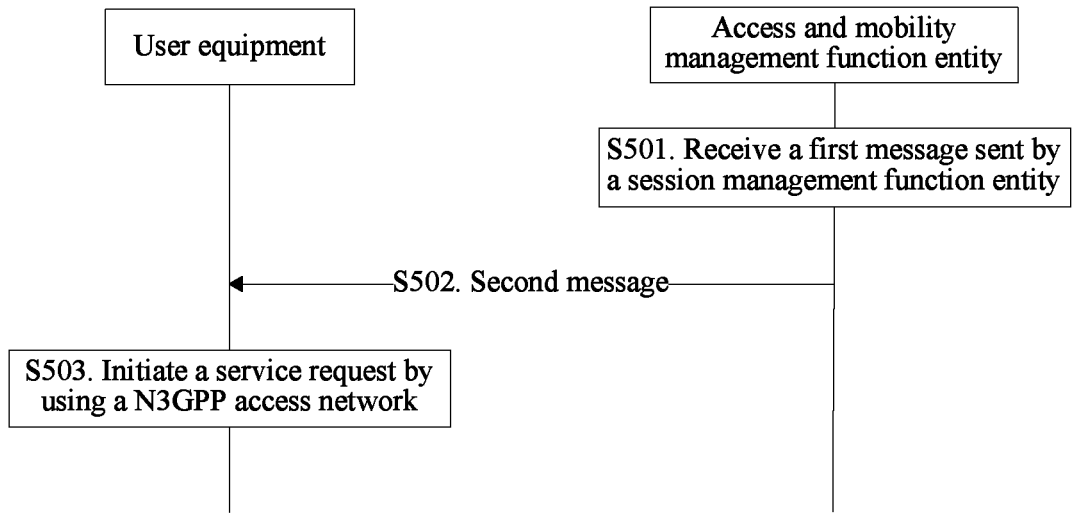
FIG. 5 is a schematic flowchart of a fourth connection reactivation method according to an embodiment of this application.

As shown in FIG. 5, FIG. 5 shows a connection reactivation method provided in this application. The method shown in FIG. 5 may be considered as an implementation of the method shown in FIG. 4. The method shown in FIG. 5 includes the following steps.

S501. An access and mobility management function entity receives a first message sent by a session management function entity.

The first message carries a first reactivation indication used to instruct to reactivate a connection of a PDU session established by user equipment on a N3GPP side. For details, refer to step S401 in the method shown in FIG. 4.

It should be noted that, the PDU session is a PDU session established before the user equipment switches from a connected state to an idle state on the N3GPP side. The first reactivation indication may be a PDU session identifier.

S502. The access and mobility management function entity sends a second message to user equipment by using a 3GPP access network.

The user equipment is in the idle state on the N3GPP side, and the second message may carry one or more of a radio access technology type associated to the PDU session, an access network identifier associated to the PDU session, and the PDU session identifier.

S503. The user equipment initiates a service request by using a N3GPP access network, to request to reactivate a connection of the PDU session.

As described above, the second message sent by the access and mobility management function entity to the user equipment may carry a connection reactivation indication used to instruct the user equipment to reactivate the connection of the PDU session. The connection reactivation indication may include one or more of the following: the PDU session identifier, the radio access technology type associated to the PDU session, and the access network identifier associated to the PDU session.

In S502, the second message carries the radio access technology type associated to the PDU session and/or the access network identifier associated to the PDU session, and optionally carries the PDU session identifier.

If the connection reactivation indication carried in the second message includes the radio access technology type associated to the PDU session or the access network identifier associated to the PDU session, it may indicate that the second message sent by the access and mobility management function entity to the user equipment is used to instruct the user equipment to reactivate the connection of the PDU session by using the N3GPP access network.

For example, the connection reactivation indication includes the PDU session identifier and the radio access technology type associated to the PDU session. After receiving the radio access technology type associated to the PDU session that is included in the connection reactivation indication, the user equipment may learn that the PDU session needs to be reactivated by using the N3GPP access network. In this way, the user equipment initiates, by using the N3GPP access network, the service request for reactivating the PDU session.

For another example, the connection reactivation indication includes the PDU session identifier and the access network identifier associated to the PDU session. After receiving the access network identifier associated to the PDU session that is included in the connection reactivation indication, the user equipment may learn that the PDU session needs to be reactivated by using the N3GPP access network. In this way, the user equipment initiates, by using the N3GPP access network, the service request for reactivating the PDU session.

However, Embodiment 2 further includes another case: The connection reactivation indication includes the PDU session identifier. In this case, after receiving the second message, the user equipment needs to determine, based on the PDU session identifier included in the connection reactivation indication and a context stored in the user equipment, that the PDU session is previously established on the N3GPP side, so as to determine to initiate, by using the N3GPP access network, the service request for reactivating the PDU session.

In addition, if the connection reactivation indication includes the PDU session identifier, the user equipment may add the PDU session identifier to the service request when initiating the service request in S503. If the service request does not carry the PDU session identifier, connections for all PDU sessions on the N3GPP side are to be reactivated. If the service request carries the PDU session identifier, only the connection of the PDU session is to be reactivated.

In the connection reactivation method shown in FIG. 5, when the user equipment is in the idle state, after receiving the first message that carries the first reactivation indication and that is sent by the session management function entity, the access and mobility management function entity sends the second message to the user equipment based on the first reactivation indication by using the 3GPP access network, to instruct the user equipment to reactivate, by using the N3GPP access network, the connection of the PDU session established on the N3GPP side. After receiving the second message, the user equipment may initiate the service request by using the N3GPP access network, to receive downlink data on the N3GPP side. Therefore, according to the connection reactivation method shown in FIG. 5, when the user equipment has accessed a core network by using both the 3GPP access network and the N3GPP access network and the user equipment is in the idle state on the N3GPP side, a connection reactivation solution enabling the user equipment to switch from the idle state to the connected state on the N3GPP side can be provided, so that the user equipment can reactivate the connection of the PDU session established on the N3GPP side, thereby ensuring successful transmission of the downlink data on the N3GPP side.

In addition, the method shown in FIG. 5 may also be applied to the following scenario: When the user equipment has accessed the core network by using both the 3GPP access network and the N3GPP access network and the user equipment is in the connected state on the N3GPP side, but a user plane connection of the PDU session has not been established, the method may also be used by the access and mobility management function entity to instruct, by using the 3GPP access network, the user equipment to reactivate the connection of the PDU session on the N3GPP side.

Figure 6:
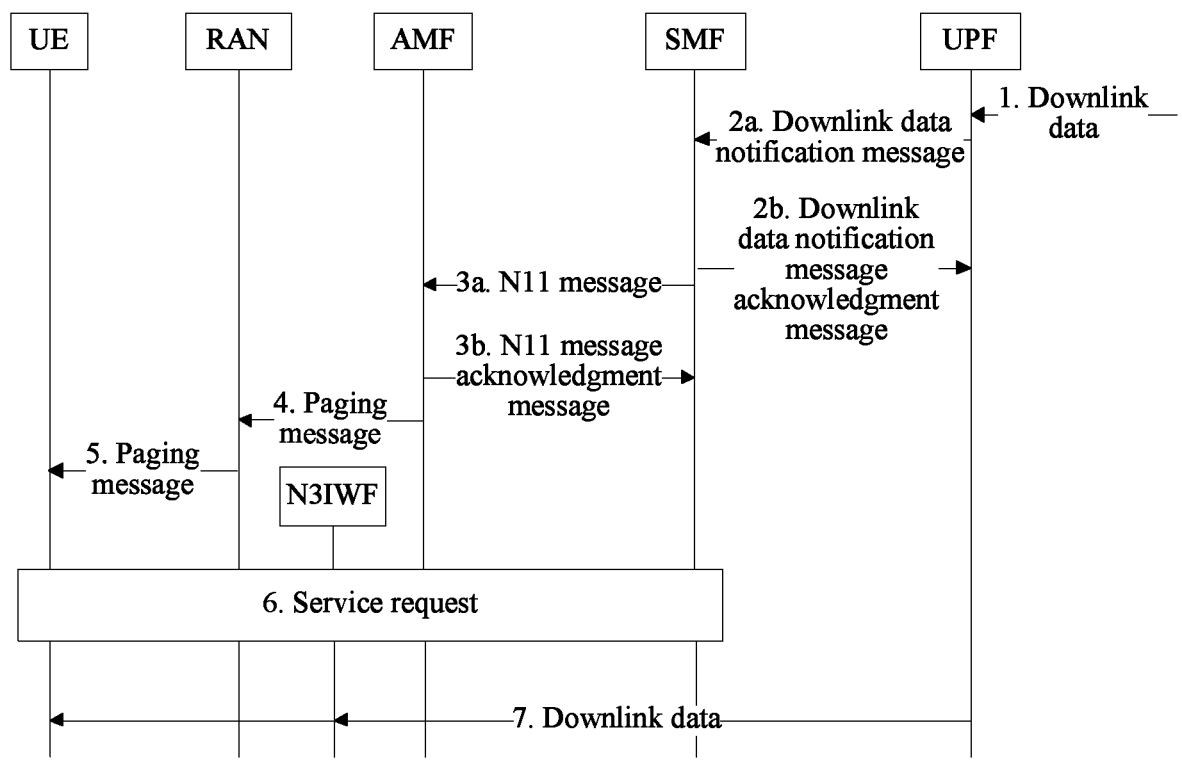
FIG. 6 is a schematic flowchart of a fifth connection reactivation method according to an embodiment of this application.

Based on the connection reactivation method shown in FIG. 5, this embodiment of this application further provides a connection reactivation method. The method is shown in FIG. 6. The connection reactivation method shown in FIG. 6 may be considered as a specific example of the connection reactivation method shown in FIG. 5. For an implementation not illustrated and described in detail in the method shown in FIG. 6, refer to related descriptions in the method shown in FIG. 5. As shown in FIG. 6, the method includes the following steps.

1. A UPF receives, in a PDU session established on a N3GPP side, downlink data to be delivered to UE.

The UE is in an idle state on the N3GPP side.

2a. The UPF sends a downlink data notification message to an SMF.

The downlink data notification message is used to indicate that the UPF has received, in the PDU session established on the N3GPP side, the downlink data to be delivered to the UE. The downlink data notification message carries a PDU session identifier.

2b. The SMF sends a downlink data notification message acknowledgment message to the UPF after receiving the downlink data notification message, to indicate that the SMF has received the downlink data notification message sent by the UPF.

3a. The SMF sends an N11 message to an AMF.

The N11 message is a specific example of the first message in the method shown in FIG. 5, and the N11 message carries the PDU session identifier.

3b. The AMF sends an N11 message acknowledgment message to the SMF, to indicate that the AMF has received the N11 message sent by the SMF.

4. The AMF sends a paging message to an RAN (radio access network).

The paging message carries a connection reactivation indication, and the connection reactivation indication is used to instruct the user equipment to reactivate a connection of the PDU session by using a N3GPP access network.

The connection reactivation indication may include one or more of the following: the PDU session identifier, a radio access technology type associated to the PDU session, and an access network identifier associated to the PDU session.

5. The RAN forwards the paging message to the UE.

A process in which the AMF sends the connection reactivation indication to the UE through forwarding by the RAN may be implemented by using the notification message or the paging message. When the UE is in an idle state on a 3GPP side, the process in which the AMF sends the connection reactivation indication to the UE through forwarding by the RAN is implemented by using the paging message. When the UE is in a connected state on the 3GPP side, the process in which the AMF sends the connection reactivation indication to the UE through forwarding by the RAN is implemented by using the notification message. The paging message is used as an example for description in FIG. 6.

6. After receiving the paging message, the UE initiates, by using an N3IWF and based on an indication of a connection reactivation indication carried in the paging message, a service request for reactivating the PDU session.

That the UE initiates, by using the N3IWF, the service request for reactivating the PDU session means that the UE initiates, by using the N3GPP access network, the service request for reactivating the PDU session.

7. The UPF sends the downlink data to the user equipment by using the N3IWF.

Embodiment B

Figure 7:
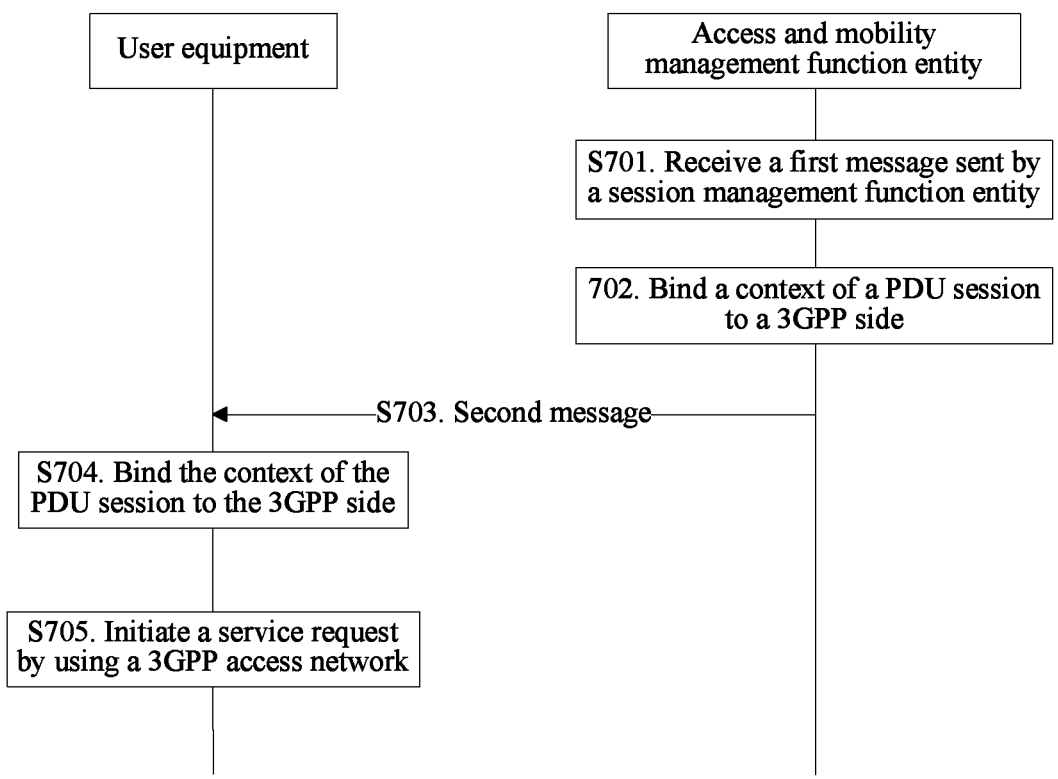
FIG. 7 is a schematic flowchart of a sixth connection reactivation method according to an embodiment of this application.

As shown in FIG. 7, FIG. 7 shows a connection reactivation method provided in this application. The method shown in FIG. 7 may be considered as an implementation of the method shown in FIG. 4. The method shown in FIG. 7 includes the following steps.

S701. An access and mobility management function entity receives a first message sent by a session management function entity.

The first message carries a first reactivation indication used to instruct to reactivate a connection of a PDU session established by user equipment on a N3GPP side. The first reactivation indication may be a PDU session identifier.

It should be noted that, the PDU session is a PDU session established before the user equipment switches from a connected state to an idle state on the N3GPP side.

S702. The access and mobility management function entity binds a context of the PDU session to a 3GPP side.

S703. The access and mobility management function entity sends a second message to user equipment by using a 3GPP access network.

The user equipment is in the idle state on the N3GPP side. The second message is used to instruct the user equipment to reactivate the connection of the PDU session by using the 3GPP access network after the user equipment switches the PDU session from the N3GPP side to the 3GPP side.

S704. After receiving the second message, the user equipment binds the context of the PDU session to the 3GPP side.

Both the user equipment and the access and mobility management function entity store the context of the PDU session established on the N3GPP side. If the connection of the PDU session needs to be reactivated by using the 3GPP access network, the access and mobility management function entity needs to bind the context of the PDU session that is stored in the access and mobility management function entity to the 3GPP side, and the user equipment also needs to bind the context of the PDU session that is stored in the user equipment to the 3GPP side.

S705. The user equipment initiates a service request by using the 3GPP access network, to request to reactivate a connection of the PDU session.

In the connection reactivation method shown in FIG. 7, the access and mobility management function entity may obtain, before sending the second message, a network policy used to indicate whether the PDU session established on the N3GPP side can be switched from N3GPP side to the 3GPP side. If the network policy indicates that the PDU session established on the N3GPP side cannot be switched from the N3GPP side to the 3GPP side, the access and mobility management function entity may refer to the steps in Embodiment A, and send the second message to instruct the user equipment to reactivate, by using the N3GPP access network, the connection of the PDU session established on the N3GPP side. If the network policy indicates that the PDU session established on the N3GPP side can be switched from the N3GPP side to the 3GPP side, step S703 to step S705 are performed.

Specifically, a manner of obtaining the network policy by the access and mobility management function entity includes but is not limited to the following two manners: The access and mobility management function entity obtains the network policy from a UDM or a PCF when the PDU session is established, or the access and mobility management function entity obtains the network policy from a UDM or a PCF when receiving the first message.

As described above, the second message sent by the access and mobility management function entity to the user equipment may carry a connection reactivation indication. The connection reactivation indication may include one or more of the following: the PDU session identifier, a radio access technology type associated to the PDU session, or an access network identifier associated to the PDU session. In addition, if the connection reactivation indication includes the PDU session identifier, the user equipment may add the PDU session identifier to the service request when initiating the service request in S705.

In the method shown in FIG. 7, after binding the context of the PDU session to the 3GPP side, the access and mobility management function entity may instruct, by using an indication of the second message, the user equipment to bind the context of the PDU session to the 3GPP side and reactivate, by using the 3GPP access network, the connection of the PDU session that is established on the N3GPP side before the user equipment switches to the idle state. After receiving the second message, the user equipment binds the context of the PDU session to the 3GPP side, and then initiates, by using the 3GPP access network, the service request for reactivating the PDU session, thereby reactivating the connection of the PDU session established on the N3GPP side before the user equipment switches to the idle state. Therefore, according to the connection reactivation method shown in FIG. 7, when the user equipment has accessed a core network by using both the 3GPP access network and the N3GPP access network and the user equipment is in the idle state on the N3GPP side, a connection reactivation solution enabling the user equipment to switch from the idle state to the connected state on the N3GPP side can be provided, so that the user equipment can reactivate the connection of the PDU session established on the N3GPP side, thereby ensuring successful transmission of downlink data on the N3GPP side.

In addition, the method shown in FIG. 7 may also be applied to the following scenario: When the user equipment has accessed the core network by using both the 3GPP access network and the N3GPP access network and the user equipment is in the connected state on the N3GPP side, but a user plane connection of the PDU session has not been established, the method may also be used by the access and mobility management function entity to instruct, by using the 3GPP access network, the user equipment to reactivate the connection of the PDU session on the 3GPP side.

Figure 8:
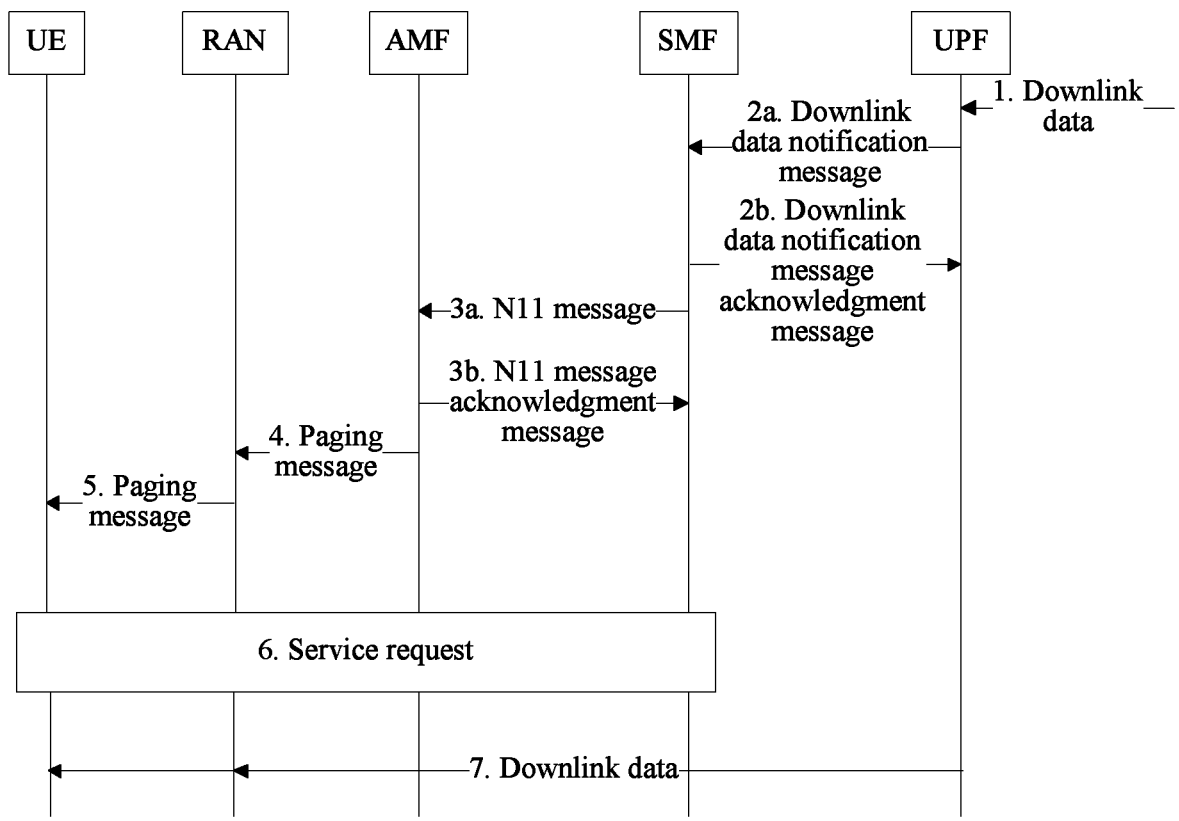
FIG. 8 is a schematic flowchart of a seventh connection reactivation method according to an embodiment of this application.

Based on the connection reactivation method shown in FIG. 7, this embodiment of this application further provides a connection reactivation method. The method is shown in FIG. 8. The connection reactivation method shown in FIG. 8 may be considered as a specific example of the connection reactivation method shown in FIG. 7. For an implementation not illustrated and described in detail in the method shown in FIG. 8, refer to related descriptions in the method shown in FIG. 7. As shown in FIG. 8, the method includes the following steps.

1. A UPF receives, in a PDU session established on a N3GPP side, downlink data to be delivered to UE.

The UE is in an idle state on the N3GPP side.

2a. The UPF sends a downlink data notification message to an SMF.

The downlink data notification message is used to indicate that the UPF has received, in the PDU session established on the N3GPP side, the downlink data to be delivered to the UE. The downlink data notification message carries a PDU session identifier.

2b. The SMF sends a downlink data notification message acknowledgment message to the UPF after receiving the downlink data notification message, to indicate that the SMF has received the downlink data notification message sent by the UPF.

3a. The SMF sends an N11 message to an AMF.

The N11 message is a specific example of the first message in the method shown in FIG. 7, and the N1 message carries the PDU session identifier.

3b. The AMF sends an N1 message acknowledgment message to the SMF, to indicate that the AMF has received the N11 message sent by the SMF.

4. The AMF sends a paging message to an RAN.

The paging message carries a connection reactivation indication. The connection reactivation indication is used to instruct the user equipment to reactivate a connection of the PDU session by using a 3GPP access network after the user equipment switches the PDU session from the N3GPP side to a 3GPP side.

The connection reactivation indication may include one or more of the following: the PDU session identifier, a radio access technology type associated to the PDU session, and an access network identifier associated to the PDU session.

The paging message is sent by the AMF to the UE after the AMF determines, based on a storage policy of the AMF, that the PDU session may be reactivated by using the 3GPP access network. The AMF may simultaneously bind a context of the PDU session to the 3GPP side, or may bind a context of the PDU session to the 3GPP side after the UE initiates a service request for reactivating the PDU session.

A manner of obtaining a network policy by the AMF includes but is not limited to the following two manners: The AMF obtains the network policy from a UDM or a PCF when the PDU session is established, or the AMF obtains the network policy from a UDM or a PCF when receiving the N11 message.

The network policy may further include a context of the PDU session that is stored in the AMF.

Specifically, the AMF may perform or instruct the SMF to perform the step of binding the context of the PDU session to the 3GPP side.

5. The RAN forwards the paging message to the UE.

A process in which the AMF sends the connection reactivation indication to the UE through forwarding by the RAN may be implemented by using the notification message or the paging message. When the UE is in an idle state on the 3GPP side, the process in which the AMF sends the connection reactivation indication to the UE through forwarding by the RAN is implemented by using the paging message. When the UE is in a connected state on the 3GPP side, the process in which the AMF sends the connection reactivation indication to the UE through forwarding by the RAN is implemented by using the notification message. The paging message is used as an example for description in FIG. 8.

6. After receiving the paging message, the UE binds, based on an indication of a connection reactivation indication carried in the paging message, a context of the PDU session to a 3GPP side, and initiates, by using the RAN, a service request for reactivating the PDU session.

That the UE initiates, by using the RAN, the service request for reactivating the PDU session means that the UE initiates, by using the 3GPP access network, the service request for reactivating the PDU session.

It should be noted that, the step of binding the context of the PDU session to the 3GPP side by the UE and the step of initiating the service request by the UE by using the RAN may be performed in any order.

7. The UPF sends the downlink data to the UE by using the RAN.

That the UPF sends the downlink data to the UE by using the RAN means that the UPF sends the downlink data to the UE by using the 3GPP access network.

Embodiment C

Figure 9:
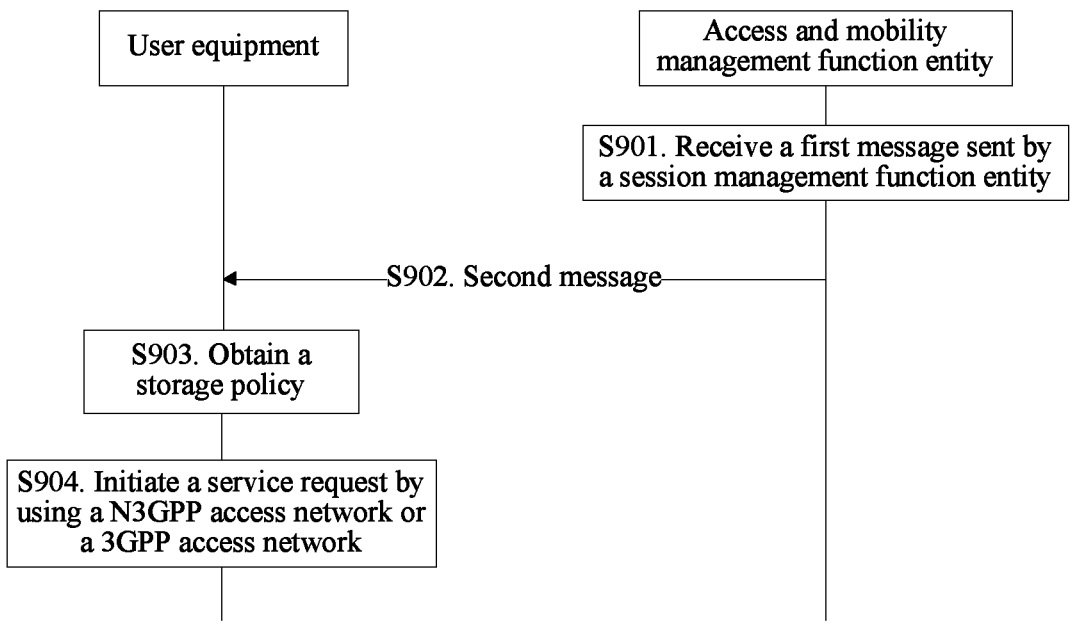
FIG. 9 is a schematic flowchart of an eighth connection reactivation method according to an embodiment of this application.

As shown in FIG. 9, FIG. 9 shows a connection reactivation method provided in this application. The method shown in FIG. 9 may be considered as an implementation of the method shown in FIG. 4. The method shown in FIG. 9 includes the following steps.

S901. An access and mobility management function entity receives a first message sent by a session management function entity.

The first message carries a first reactivation indication used to instruct to reactivate a connection of a PDU session established by user equipment on a N3GPP side. The first reactivation indication may be a PDU session identifier.

It should be noted that, the PDU session is a PDU session established before the user equipment switches from a connected state to an idle state on the N3GPP side.

S902. The access and mobility management function entity sends a second message to user equipment by using a 3GPP access network.

The user equipment is in the idle state on the N3GPP side, and the second message is used to instruct the user equipment to reactivate the connection of the PDU session, to receive downlink data.

S903. The user equipment obtains a storage policy.

The storage policy is used to indicate an access network selection policy when the user equipment initiates a service request for reactivating the PDU session.

Specifically, that the user equipment obtains the storage policy may be implemented in the following two manners: The user equipment obtains the storage policy through user configuration. Alternatively, the user equipment obtains the storage policy by using the access and mobility management function entity. That is, the access and mobility management function entity delivers the storage policy to the user equipment, or the user equipment obtains the storage policy from a network side by using a PDU session.

S904. The user equipment initiates, based on an indication of the storage policy by using a N3GPP access network, a service request for reactivating the PDU session, or the user equipment binds, based on an indication of the storage policy, a context of the PDU session to a 3GPP side, and initiates, by using the 3GPP access network, a service request for reactivating the PDU session. The step of binding the context of the PDU session to the 3GPP side by the user equipment and the step of initiating the service request by the user equipment by using an RAN may be performed in any order.

For example, the storage policy is obtained through user configuration, and user configuration specifies that: When downlink data of the PDU session is video data, the user equipment preferably reactivates the connection of the PDU session by using the N3GPP access network, so as to receive the downlink data. In this case, when performing S904, the user equipment initiates, based on the indication of the storage policy by using the N3GPP access network, the service request for reactivating the PDU session. For another example, the storage policy is obtained by using the access and mobility management function entity, and the storage policy indicates that the user equipment preferably reactivates the connection of the PDU session by using the 3GPP access network. In this case, when performing S904, the user equipment initiates, based on the indication of the storage policy by using the 3GPP access network, the service request for reactivating the PDU session.

As described above, the second message sent by the access and mobility management function entity to the user equipment may carry a connection reactivation indication. The connection reactivation indication may include one or more of the following: the PDU session identifier, a radio access technology type associated to the PDU session, or an access network identifier associated to the PDU session. In addition, if the connection reactivation indication includes the PDU session identifier, the user equipment may add the PDU session identifier to the service request when initiating the service request in S904.

In the method shown in FIG. 9, after receiving the first message sent by the session management function entity, the access and mobility management function entity sends the second message to the user equipment by using the 3GPP access network, to instruct, by using the second message, the user equipment to reactivate the connection of the PDU session established on the N3GPP side. After receiving the second message, based on the storage policy of the user equipment, the user equipment may choose to initiate, by using the N3GPP access network or the 3GPP access network, the service request for reactivating the PDU session, so as to receive the downlink data on the N3GPP side. Therefore, according to the connection reactivation method shown in FIG. 9, when the user equipment has accessed a core network by using both the 3GPP access network and the N3GPP access network and the user equipment is in the idle state on the N3GPP side, a connection reactivation solution enabling the user equipment to switch from the idle state to the connected state on the N3GPP side can be provided, so that the user equipment can reactivate the connection of the PDU session, thereby ensuring successful transmission of the downlink data.

In addition, the method shown in FIG. 9 may also be applied to the following scenario: When the user equipment has accessed the core network by using both the 3GPP access network and the N3GPP access network and the user equipment is in the connected state on the N3GPP side, but a user plane connection of the PDU session has not been established, the method may also be used by the access and mobility management function entity to instruct, on the 3GPP side, the UE to reactivate the connection of the PDU session.

Figure 10:
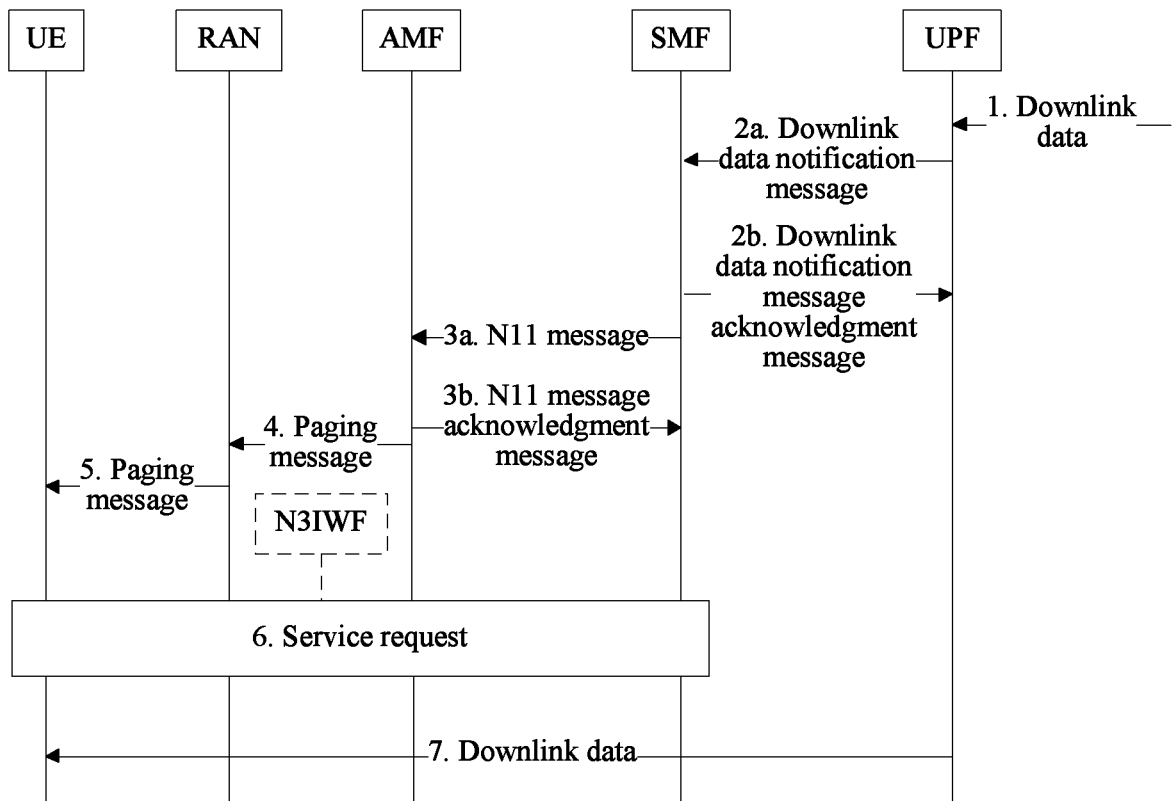
FIG. 10 is a schematic flowchart of a ninth connection reactivation method according to an embodiment of this application.

Based on the connection reactivation method shown in FIG. 9, this embodiment of this application further provides a connection reactivation method. The method is shown in FIG. 10. The connection reactivation method shown in FIG. 10 may be considered as a specific example of the connection reactivation method shown in FIG. 9. For an implementation not illustrated and described in detail in the method shown in FIG. 10, refer to related descriptions in the method shown in FIG. 9. As shown in FIG. 10, the method includes the following steps.

1. A UPF receives, in a PDU session established on a N3GPP side, downlink data to be delivered to UE.

The UE is in an idle state on the N3GPP side.

2a. The UPF sends a downlink data notification message to an SMF.

The downlink data notification message is used to indicate that the UPF has received, in the PDU session established on the N3GPP side, the downlink data to be delivered to the UE. The downlink data notification message carries a PDU session identifier.

2b. The SMF sends a downlink data notification acknowledgment message to the UPF after receiving the downlink data notification message, to indicate that the SMF has received the downlink data notification message sent by the UPF.

3a. The SMF sends an N11 message to an AMF.

The N11 message is a specific example of the first message in the method shown in FIG. 9, and the N11 message carries the PDU session identifier.

3b. The AMF sends an N11 message acknowledgment message to the SMF, to indicate that the AMF has received the N11 message sent by the SMF.

4. The AMF sends a paging message to an RAN.

The paging message carries a connection reactivation indication, and the connection reactivation indication is used to instruct the user equipment to reactivate the connection of the PDU session.

5. The RAN forwards the paging message to the UE.

A process in which the AMF sends the connection reactivation indication to the UE through forwarding by the RAN may be implemented by using the notification message or the paging message. When the UE is in an idle state on a 3GPP side, the process in which the AMF sends the connection reactivation indication to the UE through forwarding by the RAN is implemented by using the paging message. When the UE is in a connected state on the 3GPP side, the process in which the AMF sends the connection reactivation indication to the UE through forwarding by the RAN is implemented by using the notification message. The paging message is used as an example for description in FIG. 10.

6. After receiving the paging message, based on an indication of a storage policy of the UE, the UE chooses to initiate, by using an N3IWF or the RAN, a service request for reactivating the PDU session.

That the UE initiates, by using an N3IWF, a service request for reactivating the PDU session means that the UE initiates, by using a N3GPP access network, the service request for reactivating the PDU session. That the UE initiates, by using the RAN, a service request for reactivating the PDU session means that the UE initiates, by using a 3GPP access network, the service request for reactivating the PDU session.

7. The UPF sends the downlink data to the UE.

If the UE initiates, by using the N3IWF, the service request for reactivating the PDU session, the UPF sends the downlink data to the UE by using the N3IWF. If the UE initiates, by using the RAN, the service request for reactivating the PDU session, the UPF sends the downlink data to the UE by using the RAN.

In conclusion, according to the connection reactivation method provided in this application, when the user equipment accesses the 5G core network by using the N3GPP access network and the user equipment is in the idle state, a connection reactivation solution enabling the user equipment to switch from the idle state to the connected state is provided, thereby ensuring successful transmission of the downlink data.

Figure 11:
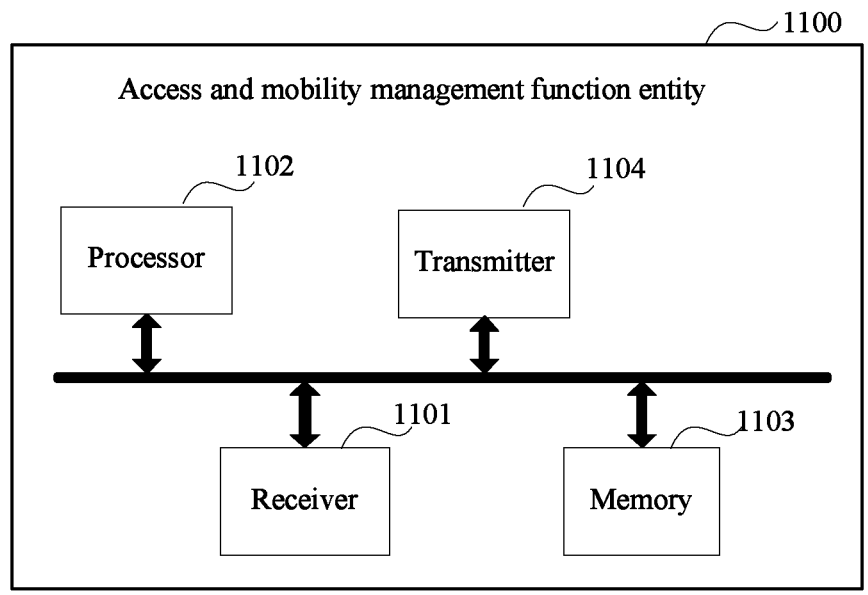
FIG. 11 is a schematic structural diagram of a first access and mobility management function entity according to an embodiment of this application.

An embodiment of this application provides an access and mobility management function entity. The access and mobility management function entity may be configured to perform operations performed by the access and mobility management function entity in the method shown in FIG. 2 or FIG. 3. As shown in FIG. 11, the access and mobility management function entity 1100 includes a receiver 1101, a processor 1102, a memory 1103, and a transmitter 1104.

The receiver 1101 is configured to receive a first message sent by a session management function entity. The first message carries a first reactivation indication used to instruct to reactivate a connection of a protocol data unit PDU session, and the PDU session is established by user equipment on a N3GPP side. The processor 1102 is configured to execute a program stored in the memory 1103 to perform the following operation: storing the first reactivation indication when the user equipment is in an idle state on the N3GPP side. The receiver 1101 is further configured to receive, by using a N3GPP access network, a second message sent by the user equipment. The second message is a periodic registration request or a first service request. The transmitter 1104 is configured to send a third message to the user equipment based on the first reactivation indication by using the N3GPP access network. The third message carries a connection reactivation indication to instruct the user equipment to reactivate the connection of the PDU session.

Alternatively, the receiver 1101 is configured to receive a first message sent by a session management function entity. The first message carries a first reactivation indication used to instruct to reactivate a connection of a protocol data unit PDU session established by user equipment on a N3GPP side. The transmitter 1104 is further configured to send a fourth message to the session management function entity when the user equipment is in an idle state on the N3GPP side. The fourth message is used to indicate that the user equipment is not reachable.

Optionally, the processor 1102 is further configured to execute the program stored in the memory 1103 to perform the following operation: obtaining a data cache timer after the receiver 1101 receives the first message sent by the session management function entity. When sending the third message to the user equipment based on the first reactivation indication by using the N3GPP access network, the transmitter 1104 is specifically configured to: before the data cache timer times out, send the third message to the user equipment based on the first reactivation indication by using the N3GPP access network.

Optionally, the processor 1102 is further configured to execute the program stored in the memory 1103 to perform the following operation: before the transmitter 1104 sends the fourth message to the session management function entity, determining, based on a time point at which the user equipment initiates a next periodic registration request, whether to send the fourth message.

Optionally, the first reactivation indication includes a session identifier of the PDU session.

Optionally, the connection reactivation indication may include one or more of the following: the session identifier of the PDU session, a radio access technology type associated to the PDU session, and an access network identifier associated to the PDU session.

It should be noted that, the access and mobility management function entity 1100 shown in FIG. 11 may be configured to perform operations performed by the access and mobility management function entity in the connection reactivation method shown in FIG. 2 or FIG. 3. For an implementation not described in detail in the access and mobility management function entity 1100, refer to related descriptions in the method shown in FIG. 2 or FIG. 3.

Figure 12:
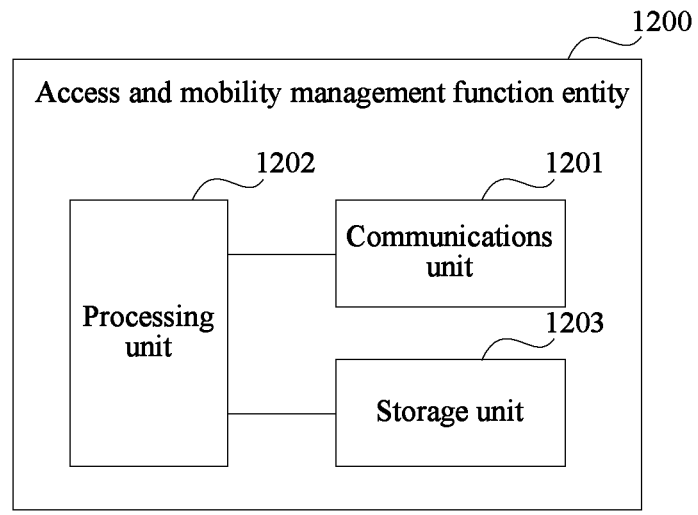
FIG. 12 is a schematic structural diagram of a second access and mobility management function entity according to an embodiment of this application.

FIG. 12 is another possible schematic structural diagram of the access and mobility management function entity (AMF) in the foregoing embodiment.

An access and mobility management function entity 1200 includes a communications unit 1201, a processing unit 1202, and a storage unit 1203. The communications unit 1201 is configured to support information receiving and sending between the access and mobility management function entity and the user equipment in the foregoing embodiment. The processing unit 1202 further performs a processing process related to the access and mobility management function entity in FIG. 2 and/or another process used for a technology described in this application. For example, the processing unit 1202 is configured to support the access and mobility management function entity in performing the processes S201 to S205 in FIG. 2 and/or another process used for a technology described in this specification. The storage unit 1203 is configured to store program code and data of the access and mobility management function entity.

It should be noted that unit division in the embodiments of this application is an example, and is merely logical function division. There may be another division manner in an actual implementation. Functional units in the embodiments of this application may be integrated into one processing unit, or each unit may exist alone physically, or two or more units are integrated into one unit. For example, in the foregoing embodiments, the first obtaining unit and the second obtaining unit may be a same unit or different units. The integrated unit may be implemented in a form of hardware, or may be implemented in a form of a software functional unit.

Figure 13:
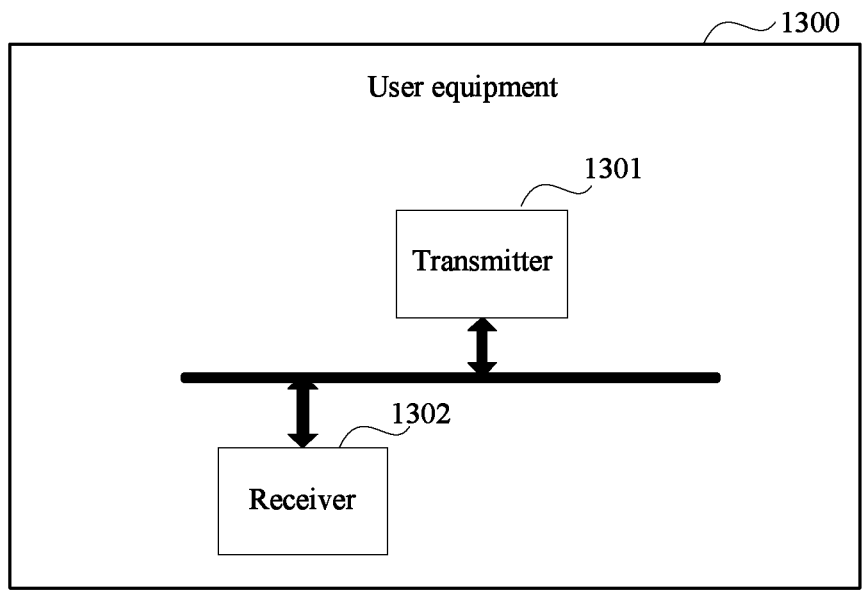
FIG. 13 is a schematic structural diagram of first user equipment according to an embodiment of this application.

An embodiment of this application provides user equipment. The user equipment may be configured to perform operations performed by the user equipment in the connection reactivation method shown in FIG. 2 or FIG. 3. As shown in FIG. 13, the user equipment 1300 includes a transmitter 1301 and a receiver 1302.

The transmitter 1301 is configured to send a second message to an access and mobility management function entity by using a N3GPP access network. The second message is a periodic registration request or a first service request. The receiver 1302 is configured to receive, by using the N3GPP access network, a third message sent by the access and mobility management function entity. The third message carries a connection reactivation indication. The transmitter 1301 is further configured to initiate a second service request by using the N3GPP access network. The second service request is used to request to reactivate a connection of the PDU session, and the PDU session is established by the user equipment on a N3GPP side.

The connection reactivation indication includes one or more of the following: a session identifier of the PDU session, a radio access technology type associated to the PDU session, and an access network identifier associated to the PDU session.

It should be noted that, the user equipment 1300 shown in FIG. 13 may be configured to perform operations performed by the user equipment in the connection reactivation method shown in FIG. 2 or FIG. 3. For an implementation not described in detail in the user equipment 1300, refer to related descriptions in the method shown in FIG. 2 or FIG. 3.

Figure 14:
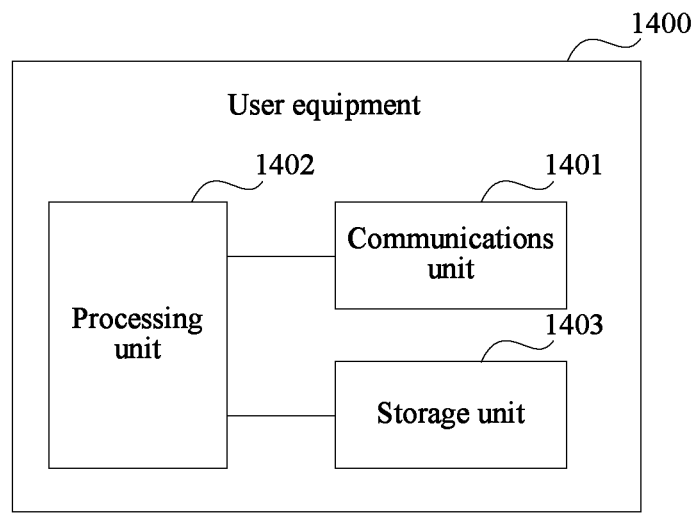
FIG. 14 is a schematic structural diagram of second user equipment according to an embodiment of this application.

FIG. 14 is another possible schematic structural diagram of the user equipment (UE) in the foregoing embodiment.

User equipment 1400 includes a communications unit 1401, a processing unit 1402, and a storage unit 1403. The communications unit 1401 is configured to support information receiving and sending between the user equipment and the access and mobility management function entity in the foregoing embodiment. The processing unit 1402 further performs a processing process related to the user equipment in FIG. 2 and/or another process used for a technology described in this application. For example, the processing unit 1402 is configured to support the user equipment in performing the processes S201 to S205 in FIG. 2 and/or another process used for a technology described in this specification. The storage unit 1403 is configured to store program code and data of the user equipment.

Figure 15:
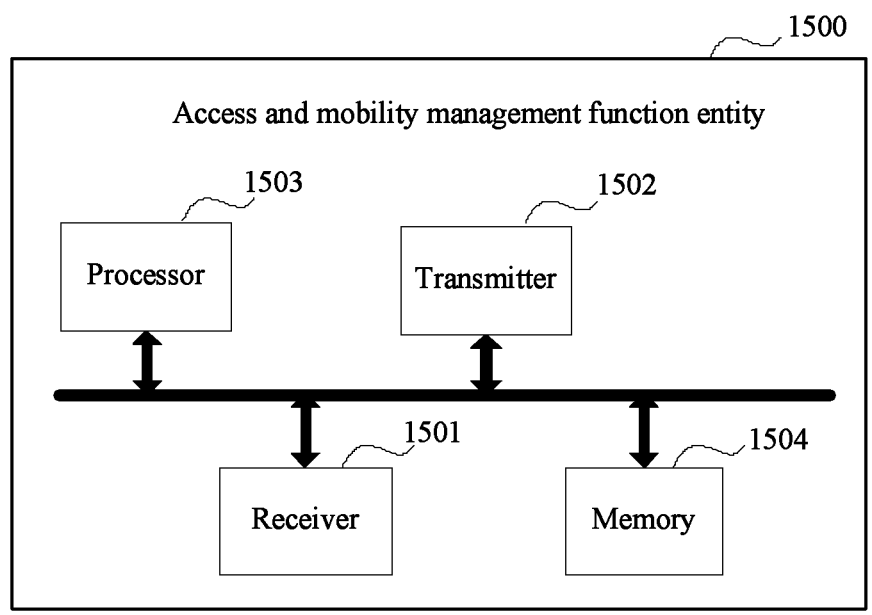
FIG. 15 is a schematic structural diagram of a third access and mobility management function entity according to an embodiment of this application.

An embodiment of this application provides an access and mobility management function entity. The access and mobility management function entity may be configured to perform operations performed by the access and mobility management function entity in any connection reactivation method shown in FIG. 4 to FIG. 10. As shown in FIG. 15, an access and mobility management function entity 1500 includes a receiver 1501 and a transmitter 1502, and may further include a processor 1503 and a memory 1504.

The receiver 1501 is configured to receive a first message sent by a session management function entity. The first message carries a first reactivation indication used to instruct to reactivate a connection of a protocol data unit PDU session established by user equipment on a N3GPP side. The transmitter 1502 is configured to: when the user equipment is in an idle state on the N3GPP side, send a second message to the user equipment based on the first reactivation indication by using a 3GPP access network. The second message is used to instruct the user equipment to reactivate the connection of the PDU session.

Optionally, when sending the second message to the user equipment based on the first reactivation indication by using the 3GPP access network, where the second message is used to instruct the user equipment to reactivate the connection of the PDU session, the transmitter 1502 is specifically configured to: when that the user equipment is in a connected state on a 3GPP side, send a notification message to the user equipment based on the first reactivation indication by using the 3GPP access network, where the notification message carries a connection reactivation indication, and the connection reactivation indication is used to instruct the user equipment to reactivate the connection of the PDU session; or when the user equipment is in an idle state on a 3GPP side, send a paging message to the user equipment based on the first reactivation indication by using the 3GPP access network, where the paging message carries a connection reactivation indication, and the connection reactivation indication is used to instruct the user equipment to reactivate the connection of the PDU session.

Optionally, the second message is used to instruct the user equipment to reactivate the connection of the PDU session by using a N3GPP access network.

Optionally, the processor 1503 is configured to execute a program stored in the memory 1504 to perform the following operation: binding a context of the PDU session to the 3GPP side after the receiver 1501 receives the first message sent by the session management function entity and before the transmitter 1502 sends the second message to the user equipment. The second message is used to instruct the user equipment to reactivate the connection of the PDU session by using the 3GPP access network after the user equipment switches the PDU session from the N3GPP side to the 3GPP side.

Optionally, the processor 1503 is further configured to execute the program stored in the memory 1504 to perform the following operation: obtaining a network policy before binding the context of the PDU session to the 3GPP side. The network policy is used to indicate that the PDU session can be switched from the N3GPP side to the 3GPP side.

Optionally, when obtaining the network policy, the processor 1503 is specifically configured to: obtain the network policy from a unified data management UDM or a policy control function entity PCF when the PDU session is established, or obtain the network policy from a UDM or a PCF when the first message is received.

Optionally, the first reactivation indication includes a session identifier of the PDU session.

Optionally, the connection reactivation indication includes one or more of the following: the session identifier of the PDU session, a radio access technology type associated to the PDU session, and an access network identifier associated to the PDU session.

It should be noted that, the access and mobility management function entity 1500 shown in FIG. 15 may be configured to perform operations performed by the access and mobility management function entity in any connection reactivation method shown in FIG. 4 to FIG. 10. For an implementation not described in detail in the access and mobility management function entity 1500, refer to related descriptions in the methods shown in FIG. 4 to FIG. 10.

Figure 16:
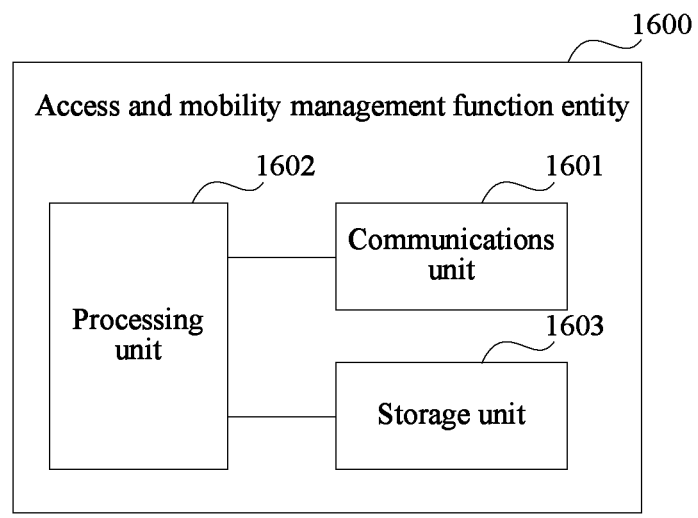
FIG. 16 is a schematic structural diagram of a fourth access and mobility management function entity according to an embodiment of this application.

FIG. 16 is another possible schematic structural diagram of the access and mobility management function entity (AMF) in the foregoing embodiment.

An access and mobility management function entity 1600 includes a communications unit 1601, a processing unit 1602, and a storage unit 1603. The communications unit 1601 is configured to support information receiving and sending between the access and mobility management function entity and the user equipment in the foregoing embodiment. The processing unit 1602 further performs a processing process related to the access and mobility management function entity in FIG. 4 and/or another process used for a technology described in this application. For example, the processing unit 1602 is configured to support the access and mobility management function entity in performing the processes S401 to S403 in FIG. 4 and/or another process used for a technology described in this specification. The storage unit 1603 is configured to store program code and data of the access and mobility management function entity.

Figure 17:
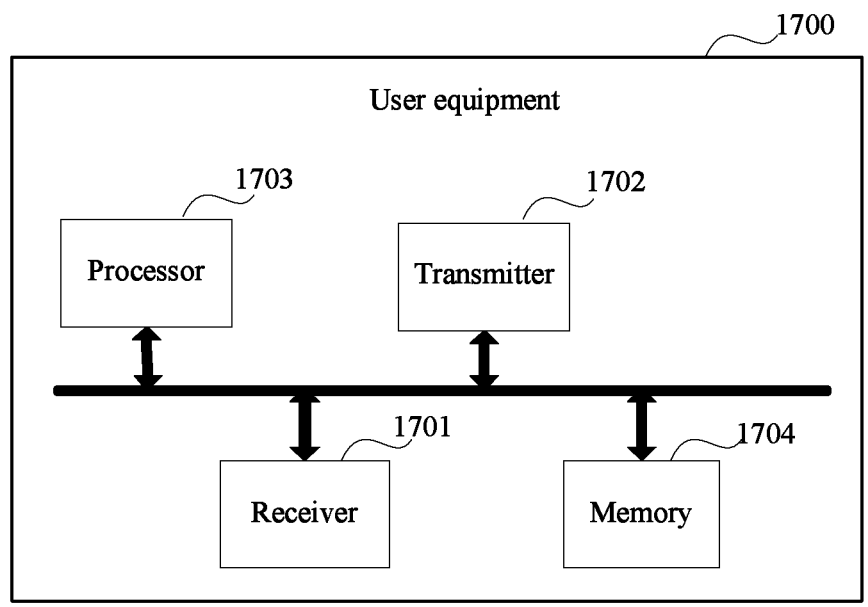
FIG. 17 is a schematic structural diagram of third user equipment according to an embodiment of this application.

This application provides user equipment. The user equipment may be configured to perform operations performed by the user equipment in any connection reactivation method shown in FIG. 4 to FIG. 10. As shown in FIG. 17, the user equipment 1700 includes a receiver 1701 and a transmitter 1702, and may further include a processor 1703 and a memory 1704.

The receiver 1701 is configured to: when the user equipment is in an idle state on aN3GPP side, receive, by using a 3GPP access network, a second message sent by an access and mobility management function entity. The second message is used to instruct to reactivate a connection of a protocol data unit PDU session established by the user equipment on the N3GPP side. The transmitter 1702 is configured to initiate a service request. The service request is used to request to reactivate the connection of the PDU session.

Optionally, when receiving, by using the 3GPP access network, the second message sent by the access and mobility management function entity, the receiver 1701 is specifically configured to: when the user equipment is in a connected state on a 3GPP side, receive, by using the 3GPP access network, a notification message sent by the access and mobility management function entity, where the notification message carries a connection reactivation indication, and the connection reactivation indication is used to instruct the user equipment to reactivate the connection of the PDU session; or when the user equipment is in an idle state on a 3GPP side, receive, by using the 3GPP access network, a paging message sent by the access and mobility management function entity, where the paging message carries a connection reactivation indication, and the connection reactivation indication is used to instruct the user equipment to reactivate the connection of the PDU session.

Optionally, when initiating the service request, the transmitter 1702 is specifically configured to initiate the service request by using aN3GPP access network.

The second message is used to instruct the user equipment to reactivate the connection of the PDU session by using the N3GPP access network.

Optionally, the processor 1703 is configured to execute a program stored in the memory 1704 to perform the following operation: before the transmitter 1702 initiates the service request, determining, based on the connection reactivation indication and a context stored in the user equipment, that the service request is to be initiated by using the N3GPP access network. When initiating the service request, the transmitter 1702 is specifically configured to initiate the service request by using the N3GPP access network.

Optionally, the processor 1703 is further configured to execute the program stored in the memory 1704 to perform the following operation: binding the context of the PDU session to the 3GPP side before the transmitter 1702 initiates the service request. When initiating the service request, the transmitter 1702 is specifically configured to initiate the service request by using the 3GPP access network. The second message is used to instruct the user equipment to reactivate the connection of the PDU session by using the 3GPP access network after the user equipment switches the PDU session from the N3GPP side to the 3GPP side.

Optionally, the processor 1703 is further configured to execute the program stored in the memory 1704 to perform the following operation: obtaining a storage policy after the receiver 1701 receives, by using the 3GPP access network, the second message sent by the access and mobility management function entity and before the transmitter 1702 initiates the service request. The storage policy is used to indicate an access network selection policy of the user equipment when the user equipment initiates the service request. When initiating the service request, the transmitter 1702 is specifically configured to: initiate the service request based on an indication of the storage policy by using the N3GPP access network; or bind the context of the PDU session to the 3GPP side based on an indication of the storage policy, and initiate the service request by using the 3GPP access network.

Optionally, when obtaining the storage policy, the processor 1703 is specifically configured to obtain the storage policy through user configuration or by using the access and mobility management function entity.

Optionally, the connection reactivation indication includes one or more of the following: a session identifier of the PDU session, a radio access technology type associated to the PDU session, and an access network identifier associated to the PDU session.

Optionally, the service request may carry the session identifier of the PDU session.

It should be noted that, the user equipment 1700 shown in FIG. 17 may be configured to perform operations performed by the user equipment in any connection reactivation method shown in FIG. 4 to FIG. 10. For an implementation not described in detail in the user equipment 1700, refer to related descriptions in the methods shown in FIG. 4 to FIG. 10.

Figure 18:
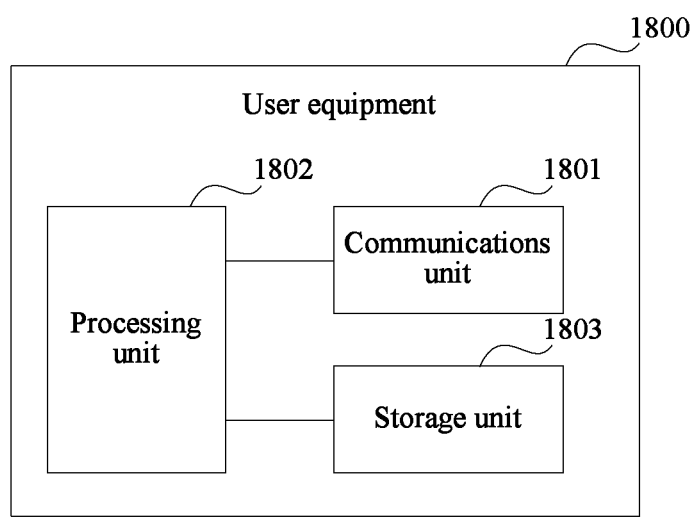
FIG. 18 is a schematic structural diagram of fourth user equipment according to an embodiment of this application.

FIG. 18 is another possible schematic structural diagram of the user equipment (UE) in the foregoing embodiment.

User equipment 1800 includes a communications unit 1801, a processing unit 1802, and a storage unit 1803. The communications unit 1801 is configured to support information receiving and sending between the user equipment and the access and mobility management function entity in the foregoing embodiment. The processing unit 1802 further performs a processing process related to the user equipment in FIG. 4 and/or another process used for a technology described in this application. For example, the processing unit 1802 is configured to support the user equipment in performing the processes S201 to S205 in FIG. 4 and/or another process used for a technology described in this specification. The storage unit 1803 is configured to store program code and data of the user equipment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A network connection reactivation method performed by an access and mobility management function entity, comprising:
receiving, from a session management function entity, a first message regarding a user equipment accessing both a 3rd Generation Partnership Project (3GPP) network and a non-3rd Generation Partnership Project (N3GPP) network, wherein the first message comprises a first reactivation indication for reactivating a connection of a protocol data unit (PDU) session established by the user equipment with the N3GPP network, and the first reactivation indication comprises a PDU Session ID of the PDU Session;
determining that the user equipment is in an idle state in the N3GPP network; and
sending to the user equipment through the 3GPP access network a connection reactivation indication based on the first reactivation indication, wherein the connection reactivation indication instructs the user equipment to reactivate the connection of the PDU session, and the connection reactivation indication comprises a radio access technology type associated to the PDU session.

2. The method according to claim 1, wherein the step of sending the connection reactivation indication comprises:
determining that the user equipment is in a connected state in the 3GPP network;
sending to the user equipment through the 3GPP access network a notification containing the connection reactivation indication.

3. The method according to claim 1, wherein the step of sending the connection reactivation indication comprises:
determining that the user equipment is in an idle state in the 3GPP network;
sending to the user equipment through the 3GPP access network a paging message containing the connection reactivation indication.

4. The method according to claim 1, wherein the first reactivation indication comprises a session identifier of the PDU session.

5. The method according to claim 4, further comprising:
receiving from the user equipment through the 3GPP access network a service request, wherein the service request comprises the session identifier of the PDU session.

6. An access and mobility management function entity, comprising:
a memory storing executable instructions;
a processor coupled to the memory and configured to execute the executable instructions stored in the memory to:
receive from a session management function entity a first message regarding a user equipment accessing both a 3rd Generation Partnership Project (3GPP) network and a non-3rd Generation Partnership Project (N3GPP) network, wherein the first message comprises a first reactivation indication instructing to reactivate a connection of a protocol data unit (PDU) session established by the user equipment with the N3GPP network, and the first reactivation indication comprises a PDU Session ID of the PDU Session;
determine that the user equipment is in an idle state in the N3GPP network; and
send to the user equipment through the 3GPP access network a connection reactivation indication based on the first reactivation indication, wherein the connection reactivation indication instructs the user equipment to reactivate the connection of the PDU session, and the connection reactivation indication comprises a radio access technology type associated to the PDU session.

7. The access and mobility management function entity according to claim 6, wherein the processor is configured to send the connection reactivation indication by performing operations of:
determining that the user equipment is in a connected state in the 3GPP network; and
sending to the user equipment through the 3GPP access network a notification message containing the connection reactivation indication.

8. The access and mobility management function entity according to claim 6, wherein the processor is configured to send the connection reactivation indication by performing operations of:
determining that the user equipment is in an idle state in the 3GPP network; and
sending to the user equipment through the 3GPP access network a paging message containing the connection reactivation indication.

9. The access and mobility management function entity according to claim 6, wherein the first reactivation indication comprises a session identifier of the PDU session.

10. The access and mobility management function entity according to claim 9, wherein the processor is further configured to:
receive a service request from the user equipment through the 3GPP access network, wherein the service request comprises the session identifier of the PDU session.

11. A communication system comprising:
a session management function entity; and
an access and mobility management function entity;
the session management function being configured to:
send a first message carrying a first reactivation indication for reactivating a connection of a protocol data unit (PDU) session established by a user equipment with a non-3rd Generation Partnership Project (N3GPP) network, where the user equipment accesses both a 3rd Generation Partnership Project (3GPP) network and the N3GPP network, wherein the first reactivation indication comprises a PDU Session ID of the PDU Session;
the access and mobility management function entity being configured to:
receive the first message;
determine the user equipment is in an idle state in the N3GPP network; and
send to the user equipment through the 3GPP access network a connection reactivation indication based on the first reactivation indication to instruct the user equipment to reactivate the connection of the PDU session, wherein the connection reactivation indication comprises a radio access technology type associated to the PDU session.

12. The system according to claim 11, wherein the access and mobility management function entity is configured to send the connection reactivation indication by performing operations of:
determining that the user equipment is in a connected state in the 3GPP network; and
sending to the user equipment through the 3GPP access network a notification message containing a connection reactivation indication.

13. The system according to claim 11, wherein the access and mobility management function entity is configured to send the connection reactivation indication by performing operations of:
determining that the user equipment is in an idle state in the 3GPP network; and
sending to the user equipment through the 3GPP access network a paging message containing the connection reactivation indication.

14. The system according to claim 11, wherein the first reactivation indication comprises a session identifier of the PDU session.

15. The system according to claim 14, wherein the access and mobility management function entity is further configured to receive from the user equipment through the 3GPP access network a service request, wherein the service request comprises the session identifier of the PDU session.

* * * * *